Dec. 7, 1943.  G. C. PAXTON ET AL  2,336,287
APPARATUS FOR MATCHING MULTIPLE BOXES
Filed Aug. 1, 1940   20 Sheets-Sheet 3
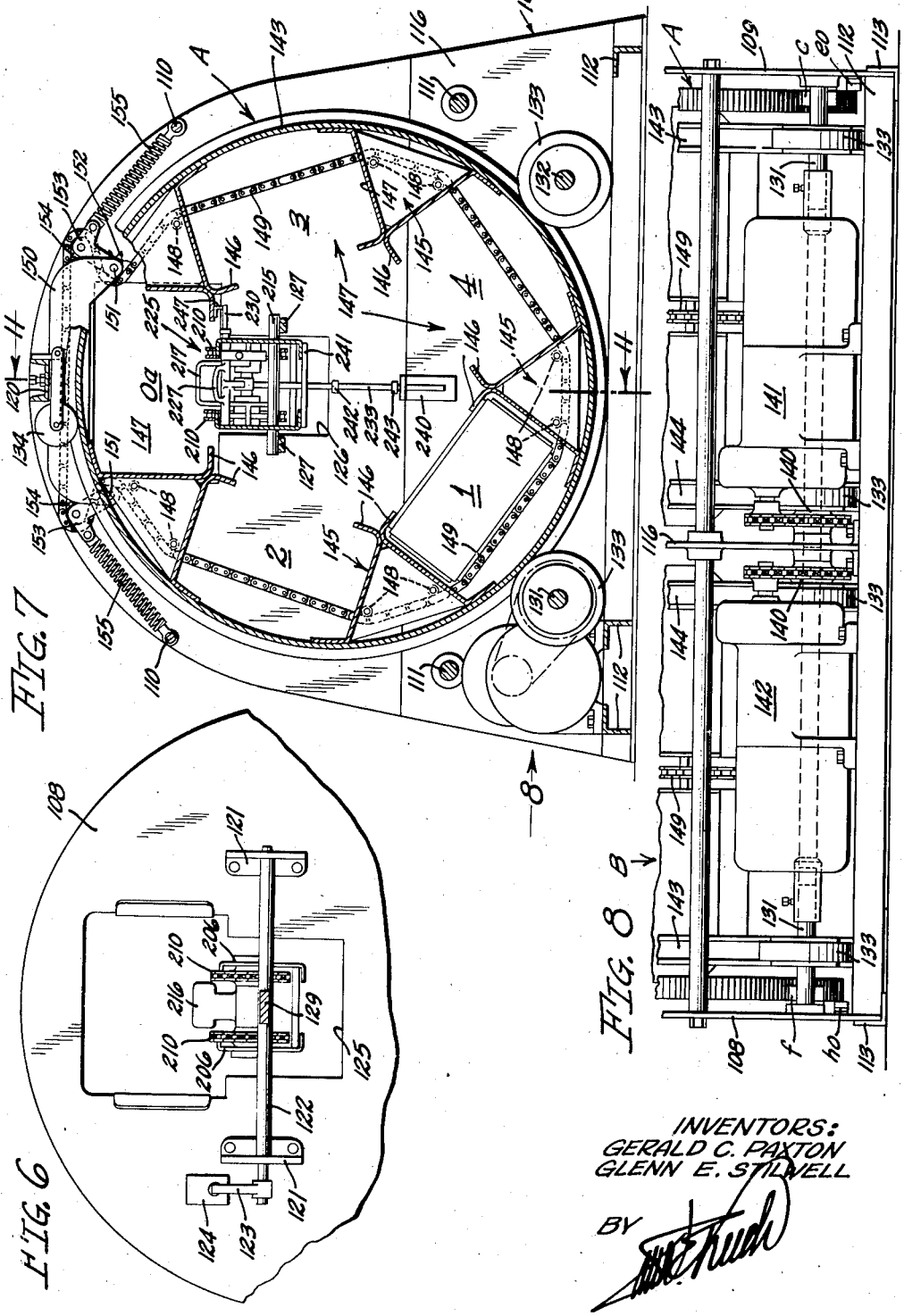
INVENTORS:
GERALD C. PAXTON
GLENN E. STILWELL
BY
ATTORNEY Dec. 7, 1943.  G. C. PAXTON ET AL  2,336,287
APPARATUS FOR MATCHING MULTIPLE BOXES
Filed Aug. 1, 1940  20 Sheets-Sheet 4
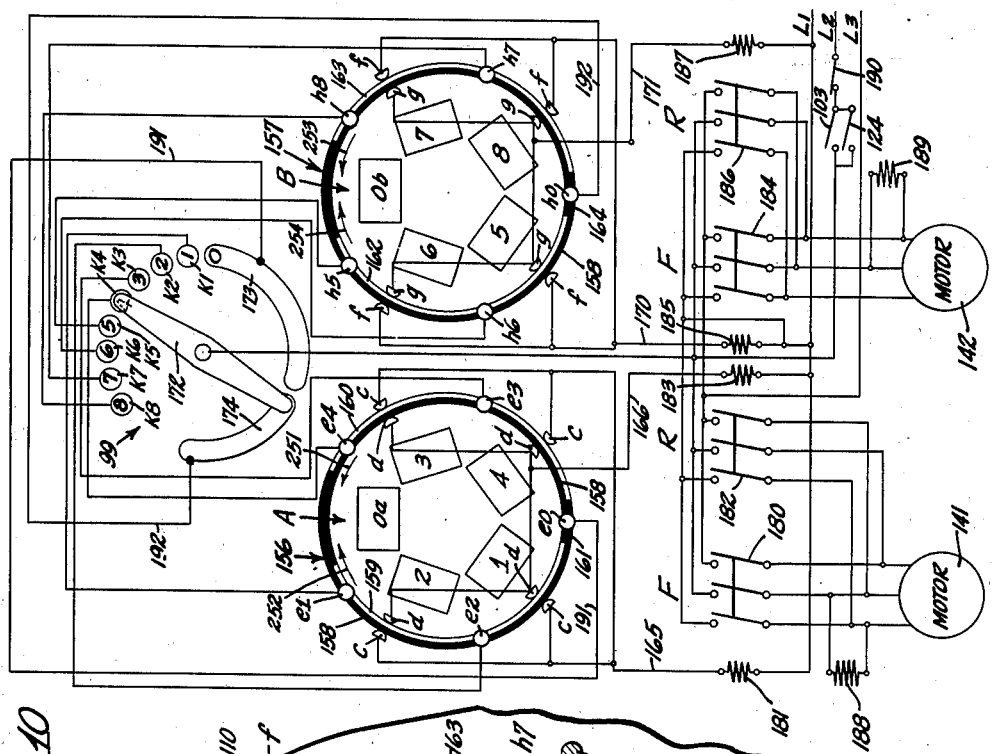
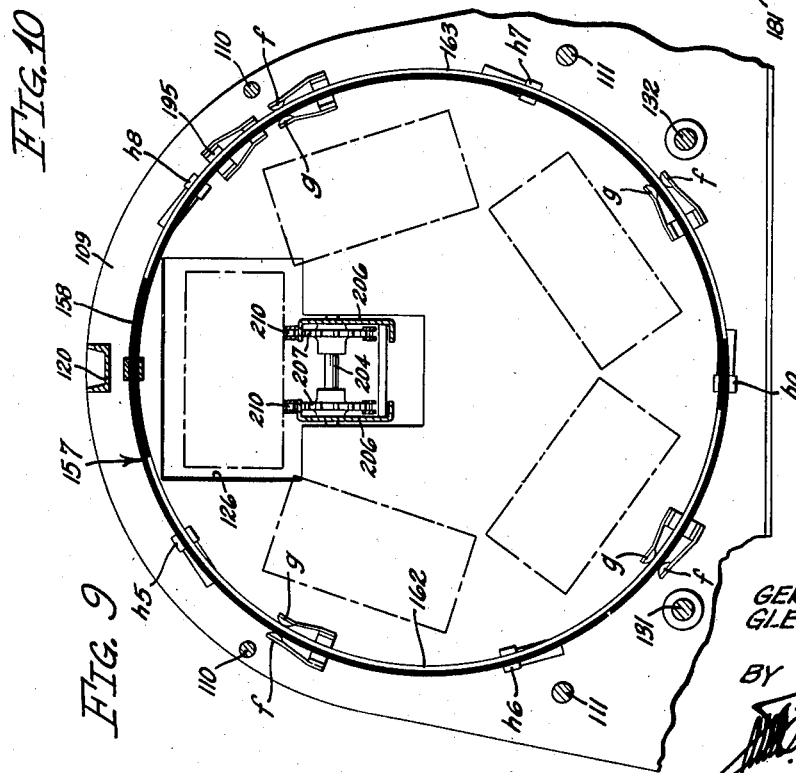
INVENTORS:
GERALD C. PAXTON
GLENN E. STILWELL
BY
ATTORNEY

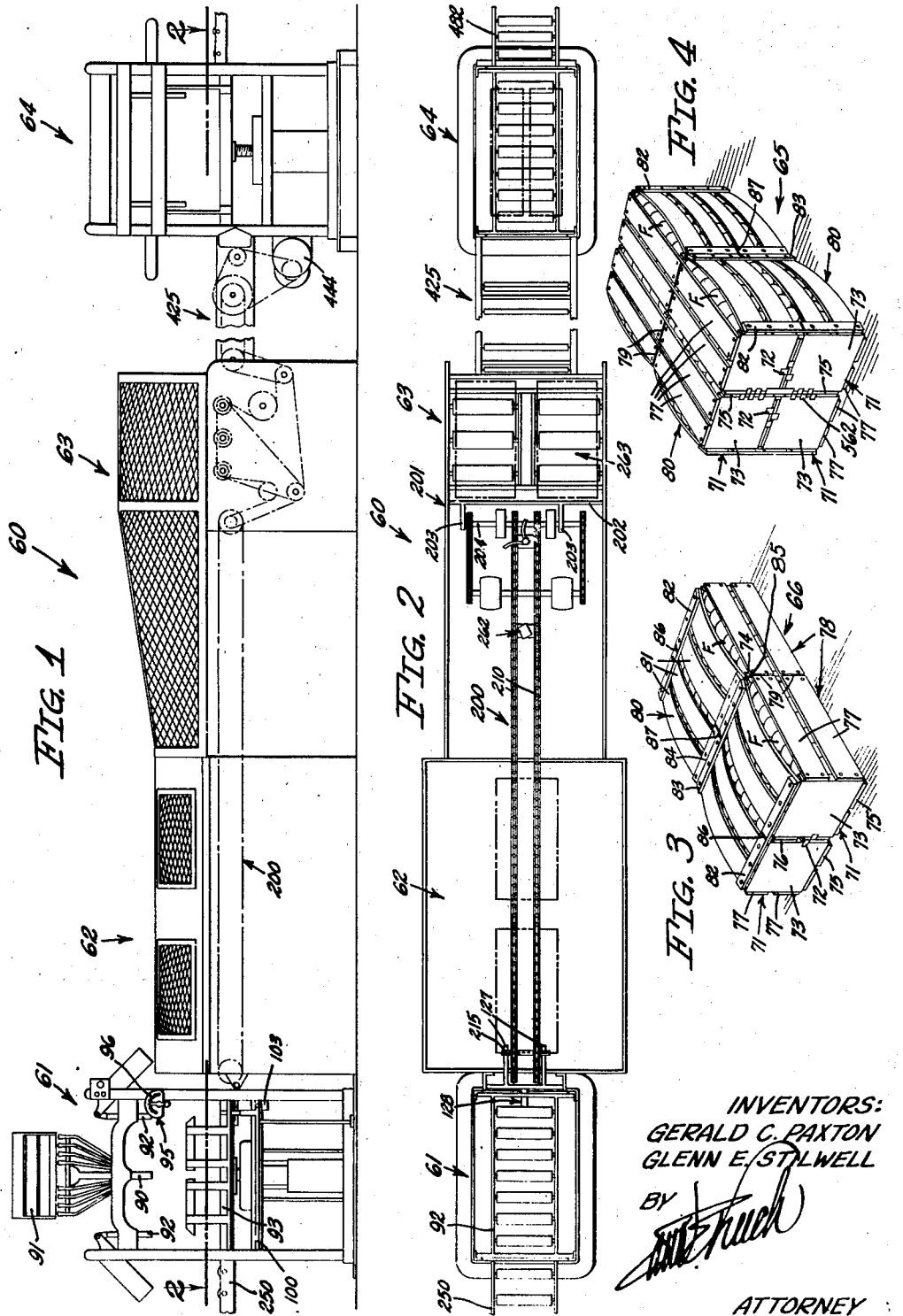

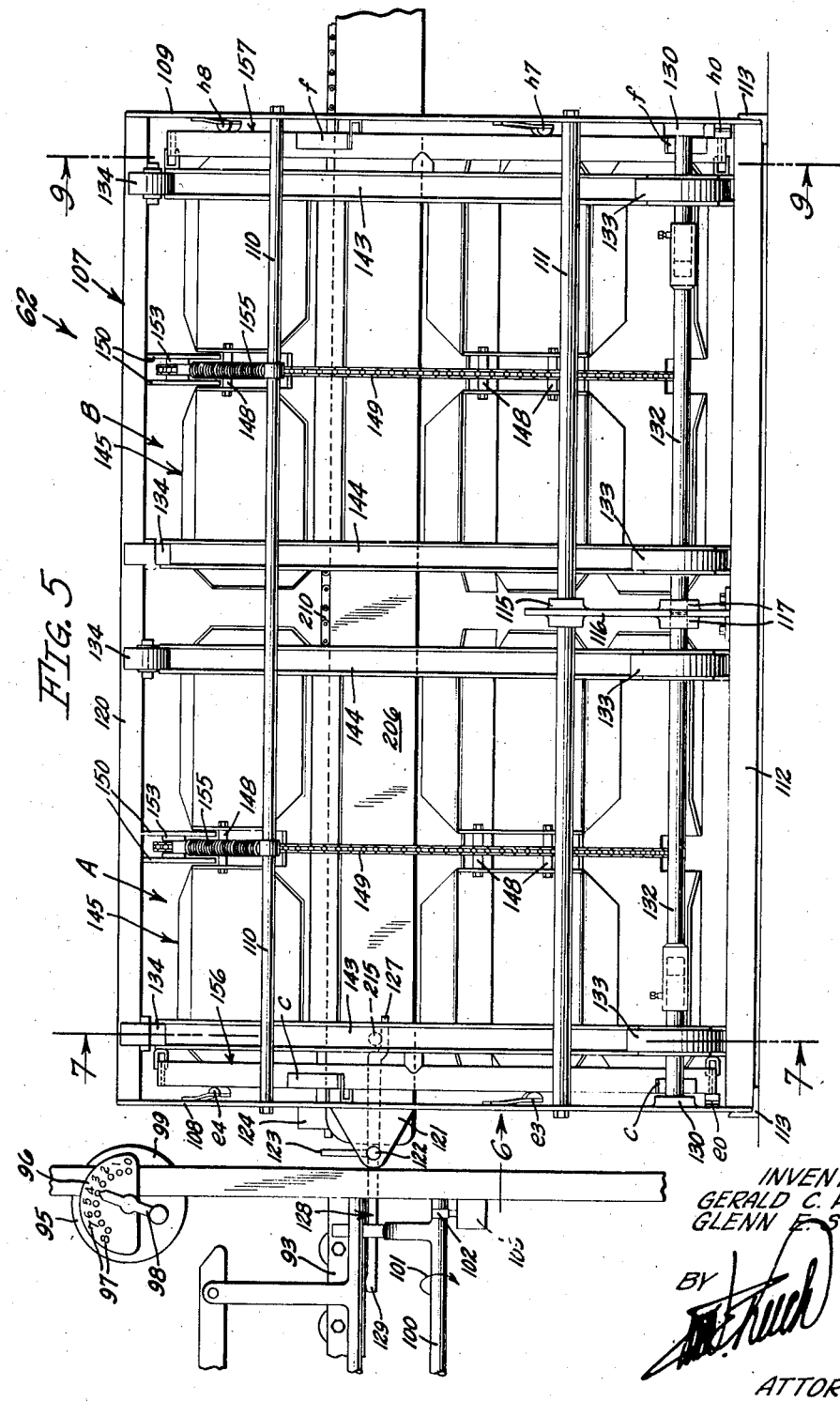

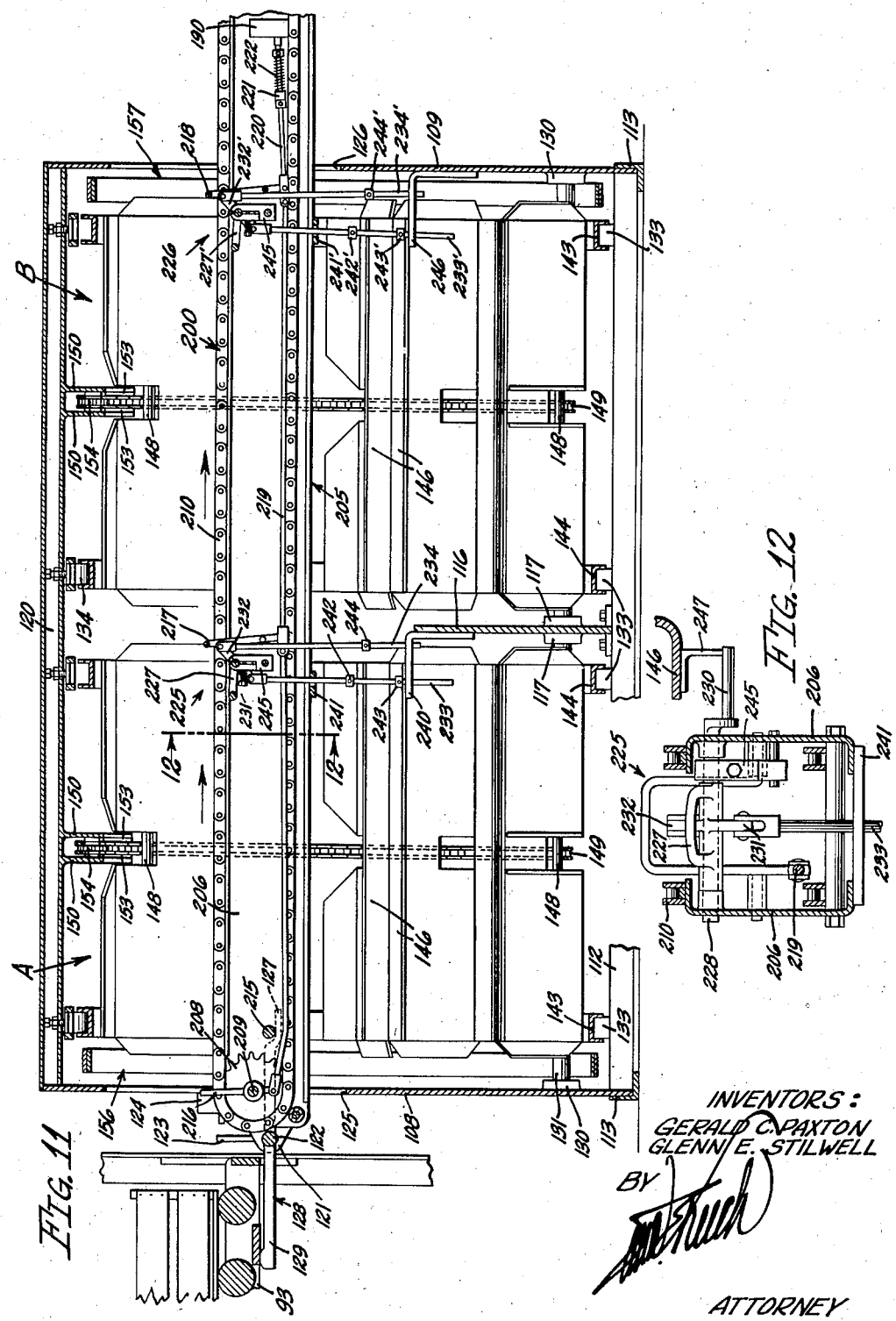

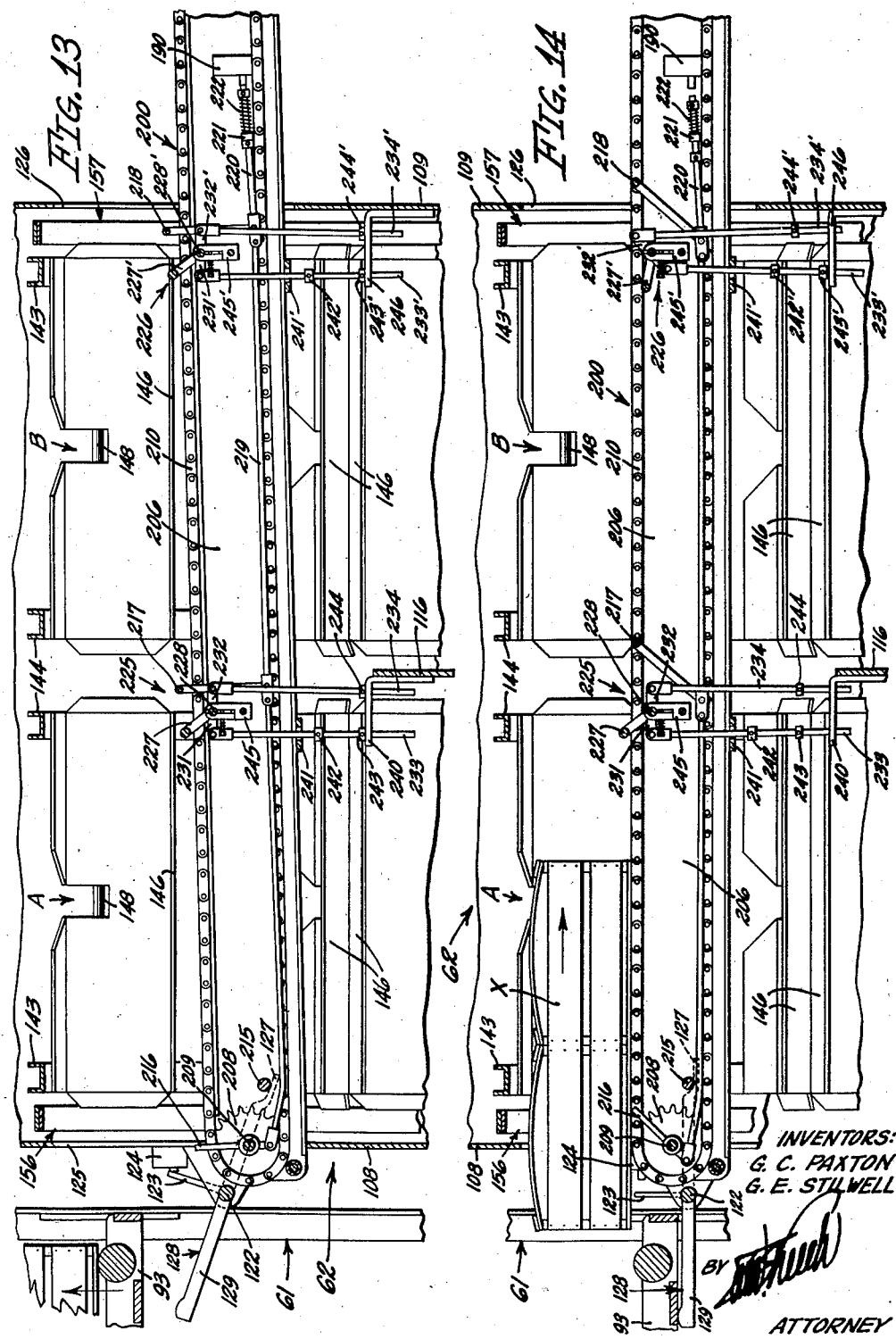

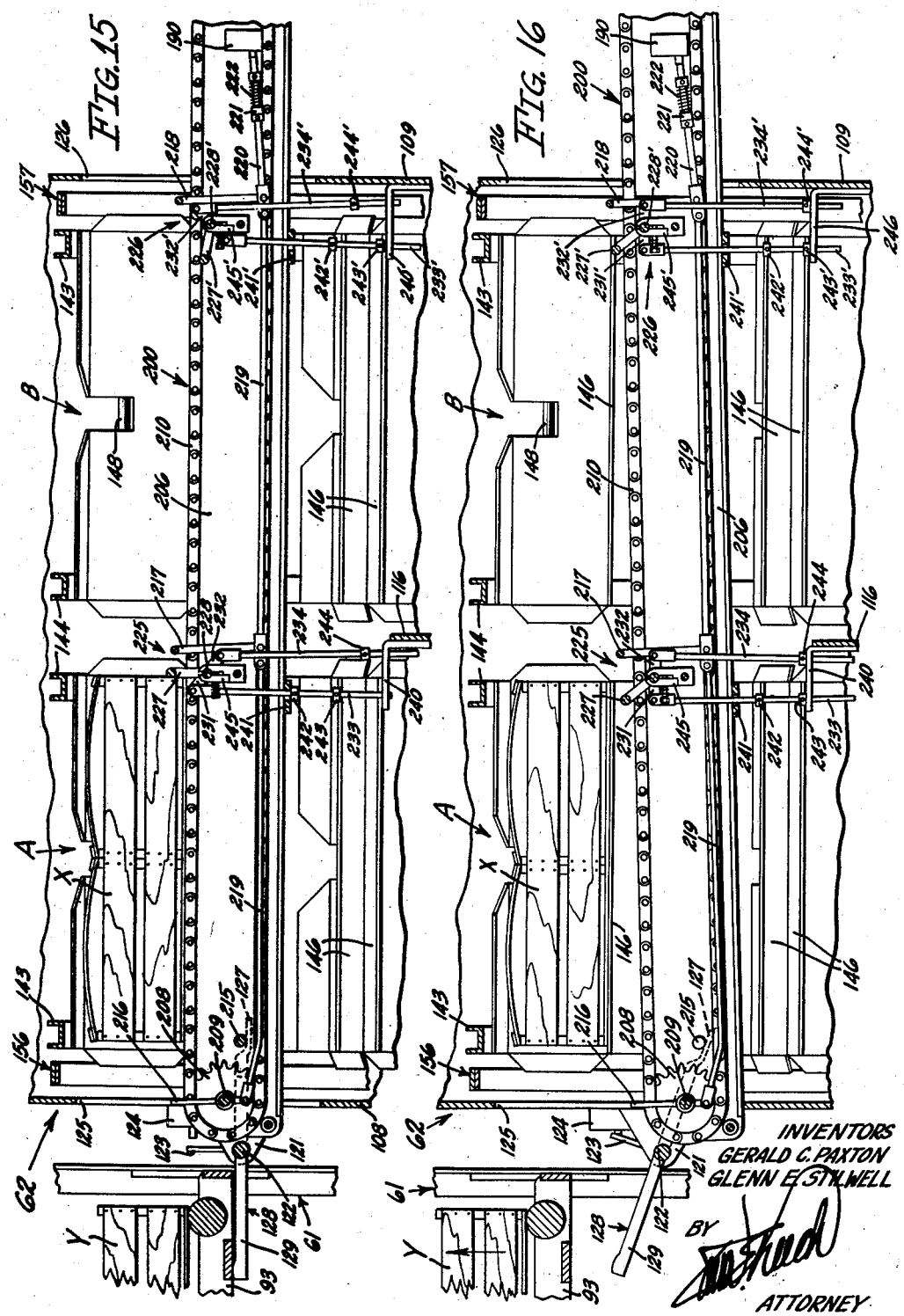

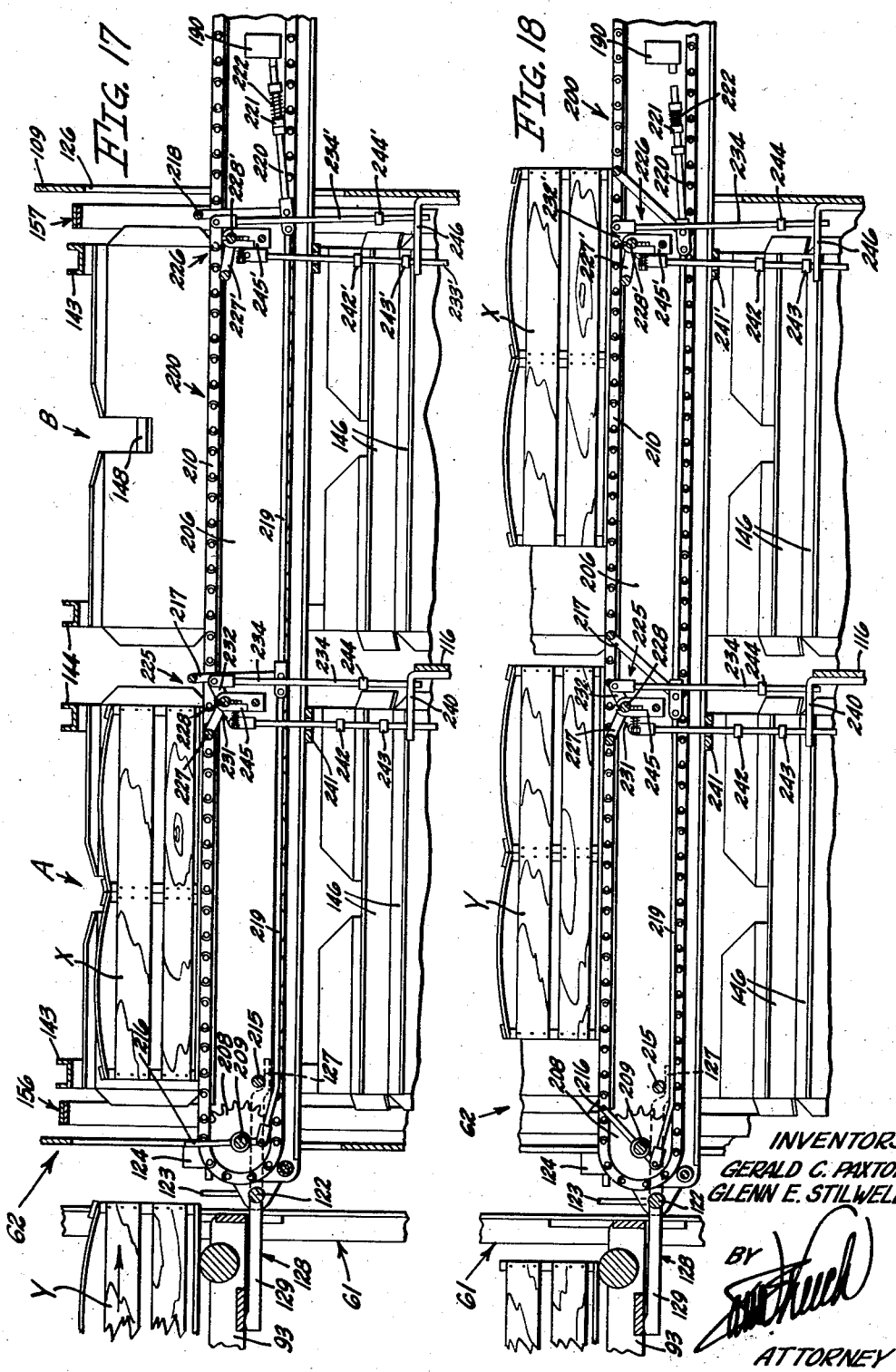

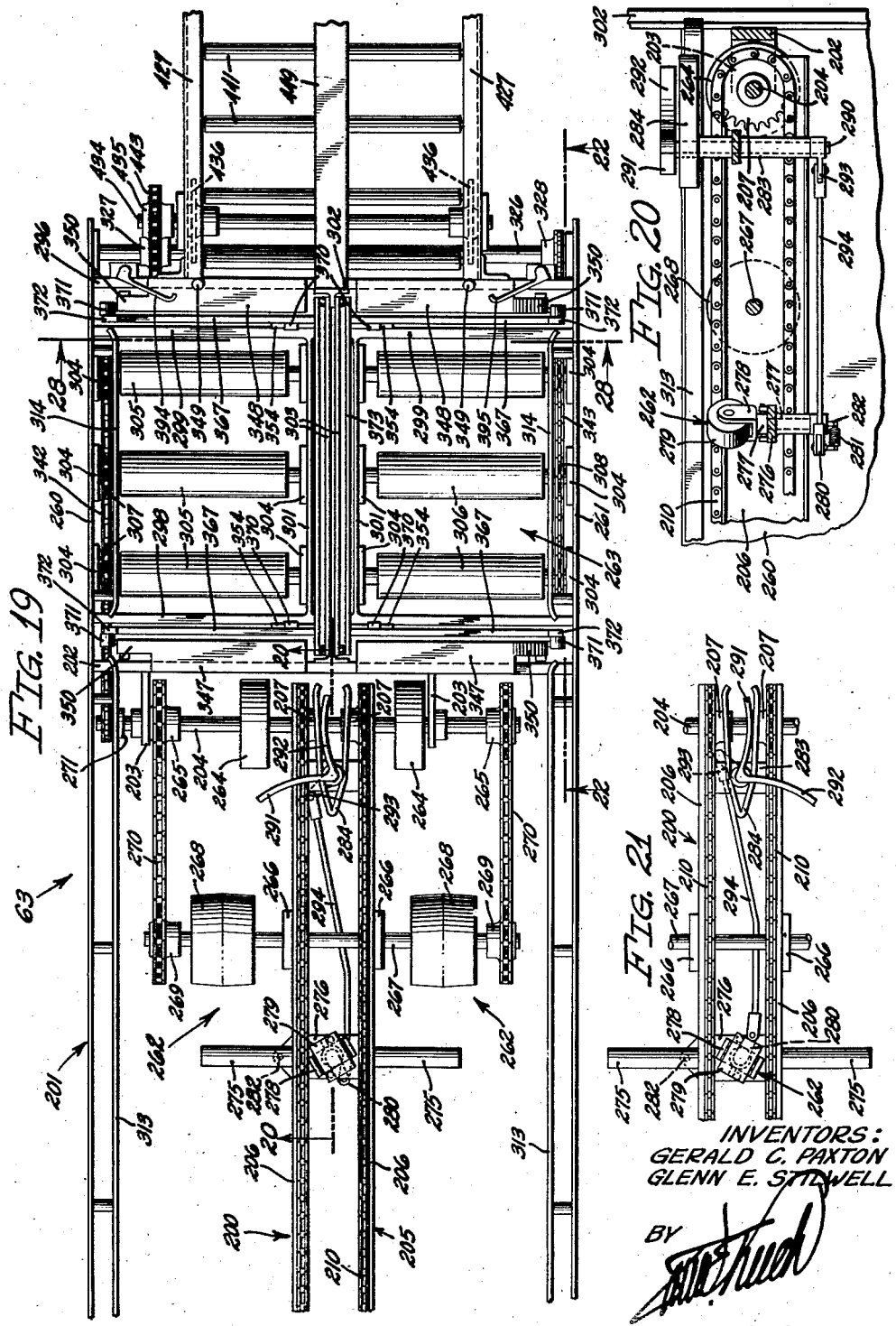

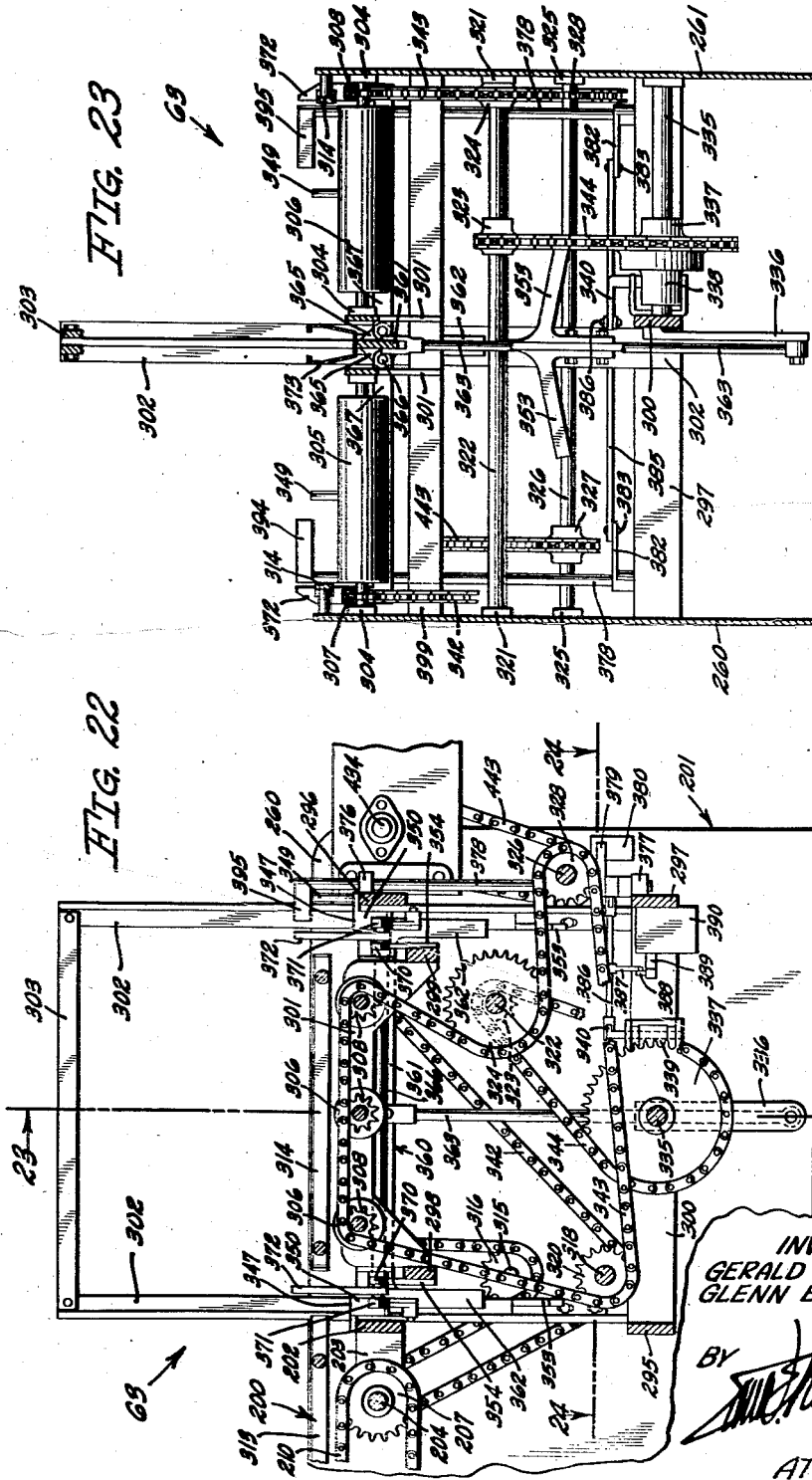

Dec. 7, 1943. G. C. PAXTON ET AL 2,336,287
APPARATUS FOR MATCHING MULTIPLE BOXES
Filed Aug. 1, 1940 20 Sheets-Sheet 11
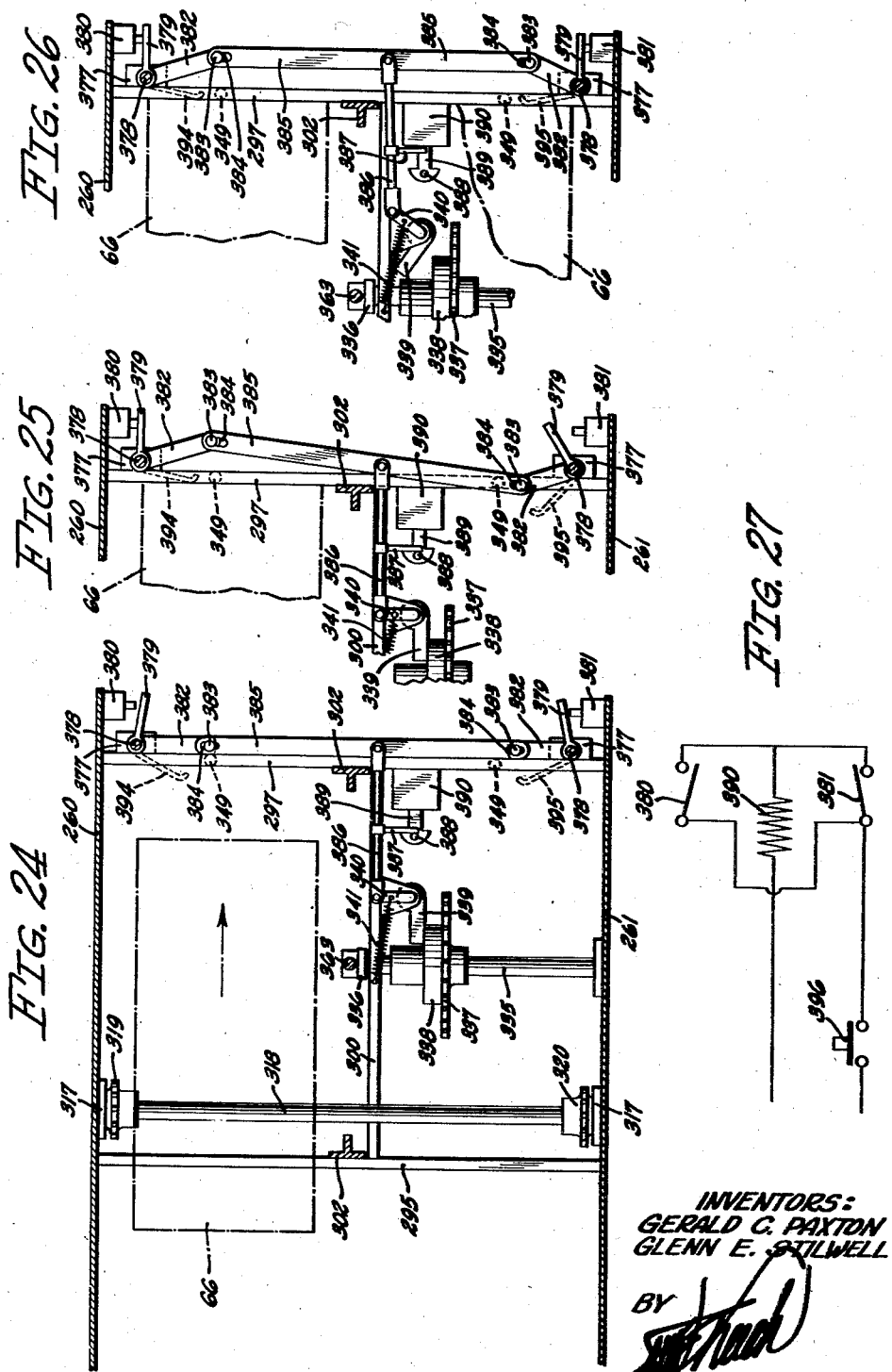
INVENTORS:
GERALD C. PAXTON
GLENN E. STILWELL
BY
ATTORNEY

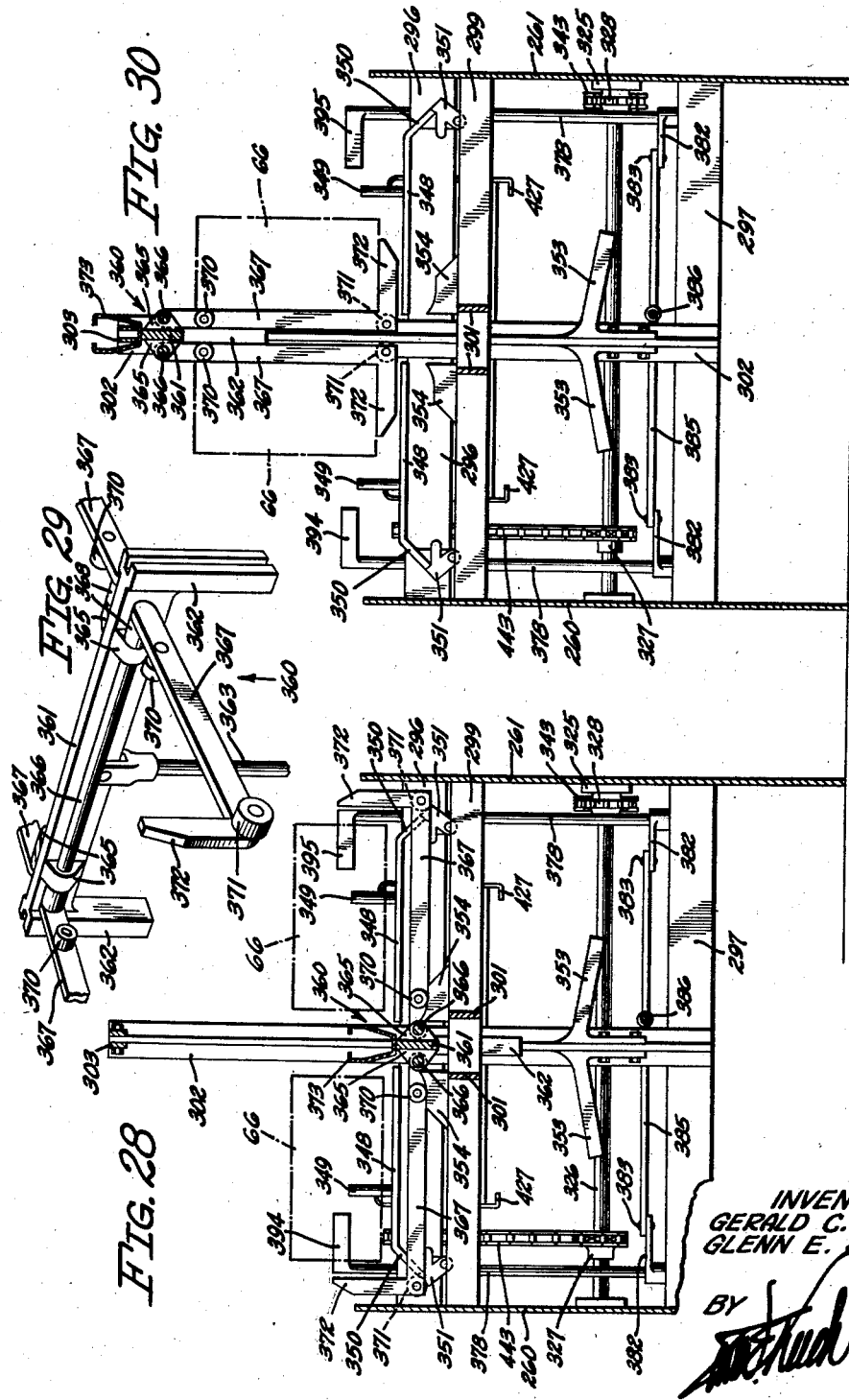

Dec. 7, 1943.　　G. C. PAXTON ET AL　　2,336,287
APPARATUS FOR MATCHING MULTIPLE BOXES
Filed Aug. 1, 1940　　20 Sheets-Sheet 13
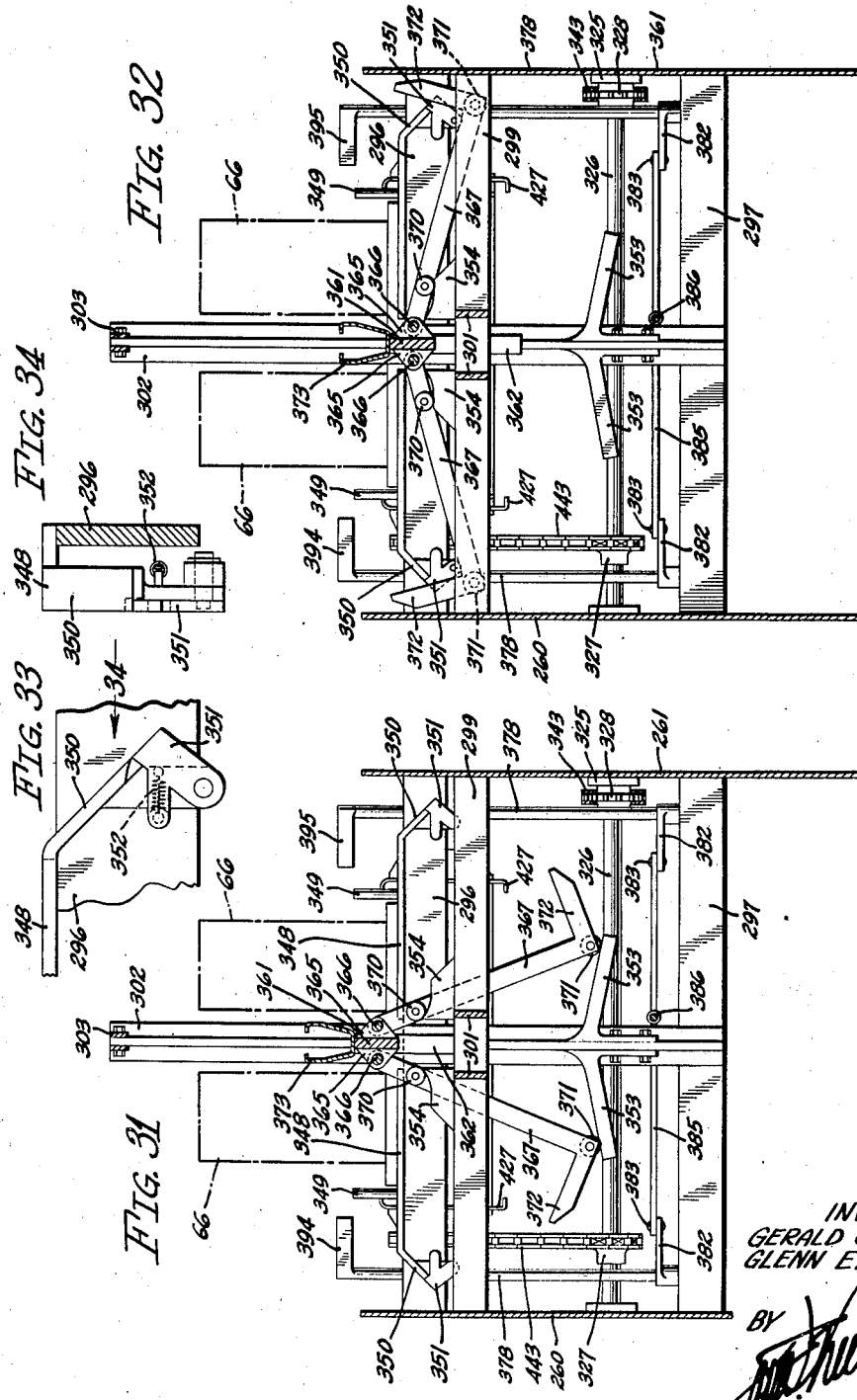
INVENTORS:
GERALD C. PAXTON
GLENN E. STILWELL
BY
ATTORNEY Dec. 7, 1943.   G. C. PAXTON ET AL   2,336,287
APPARATUS FOR MATCHING MULTIPLE BOXES
Filed Aug. 1, 1940   20 Sheets-Sheet 14
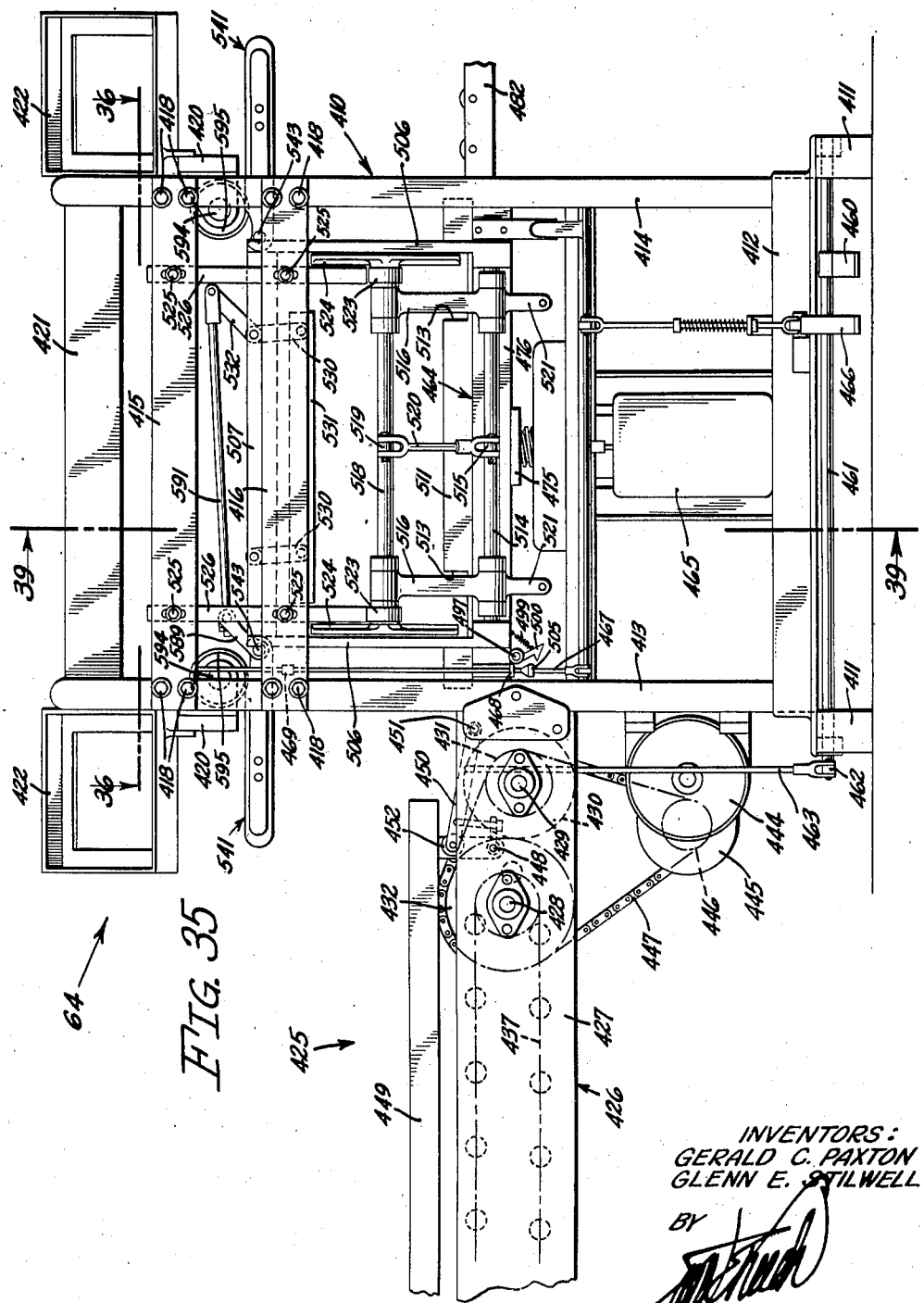
INVENTORS:
GERALD C. PAXTON
GLENN E. STILWELL
BY
ATTORNEY

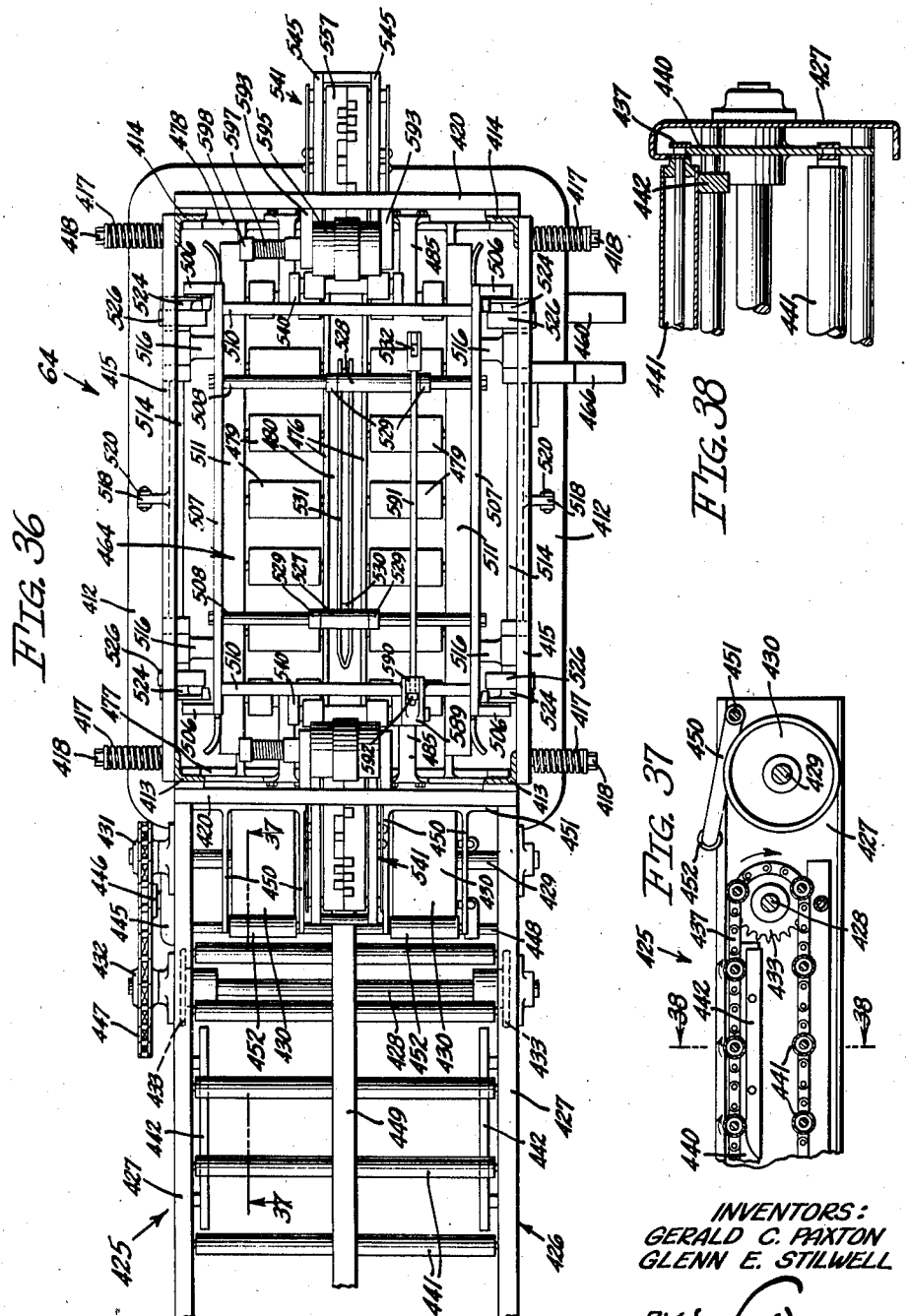

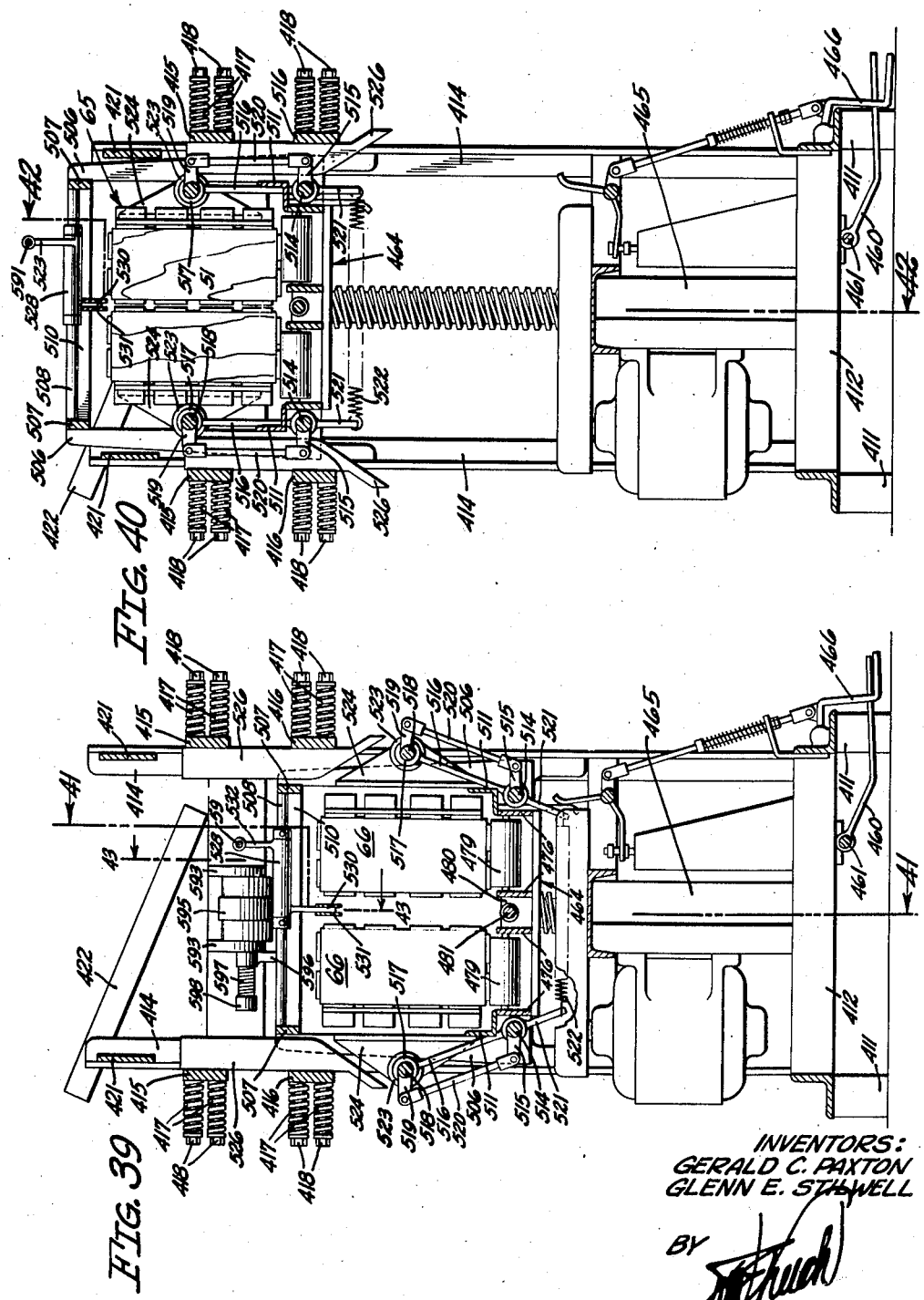

Dec. 7, 1943. G. C. PAXTON ET AL 2,336,287
APPARATUS FOR MATCHING MULTIPLE BOXES
Filed Aug. 1, 1940 20 Sheets-Sheet 17
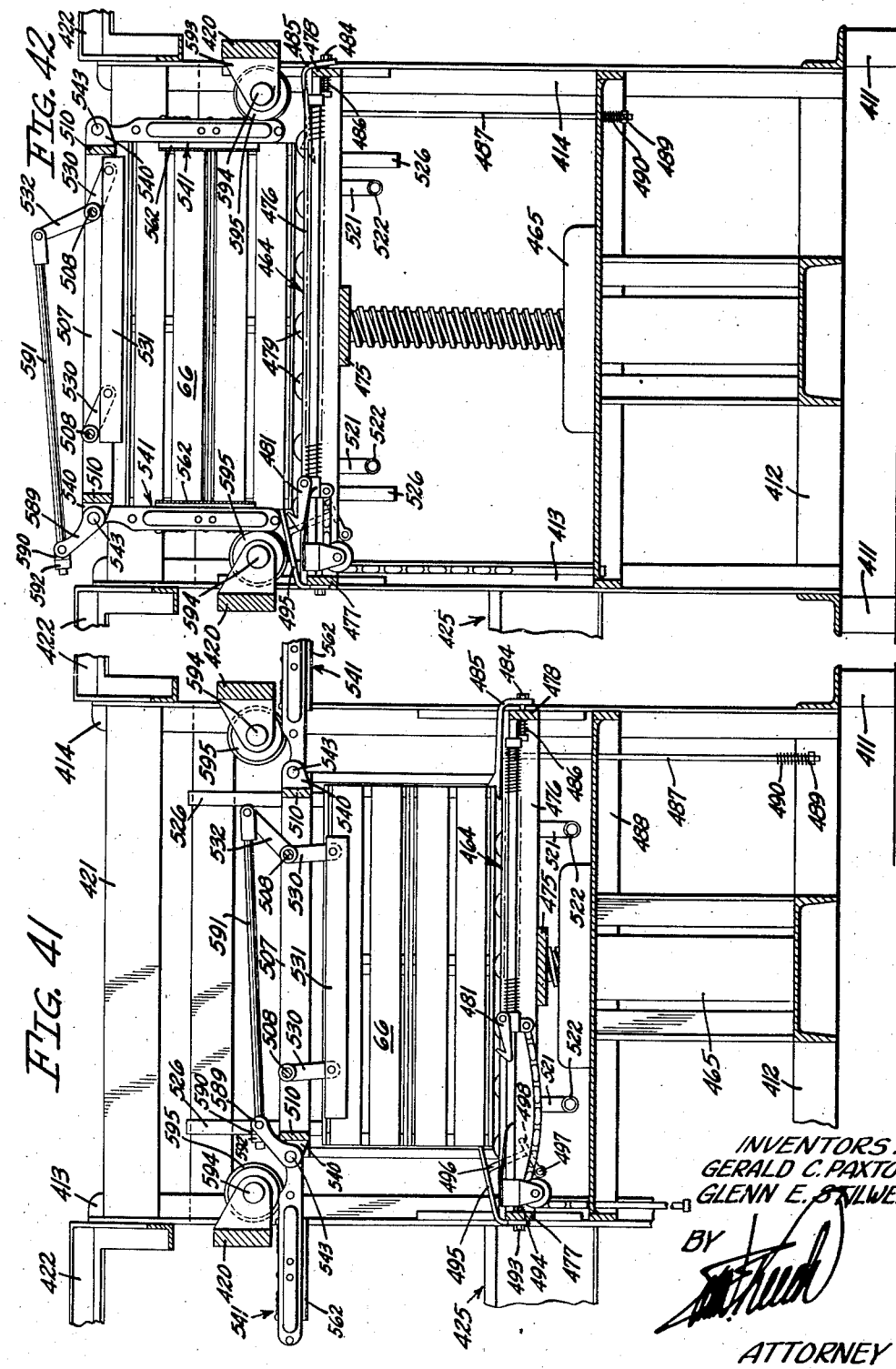
INVENTORS:
GERALD C. PAXTON
GLENN E. STILWELL
BY
ATTORNEY Dec. 7, 1943.  G. C. PAXTON ET AL  2,336,287
APPARATUS FOR MATCHING MULTIPLE BOXES
Filed Aug. 1, 1940    20 Sheets-Sheet 18
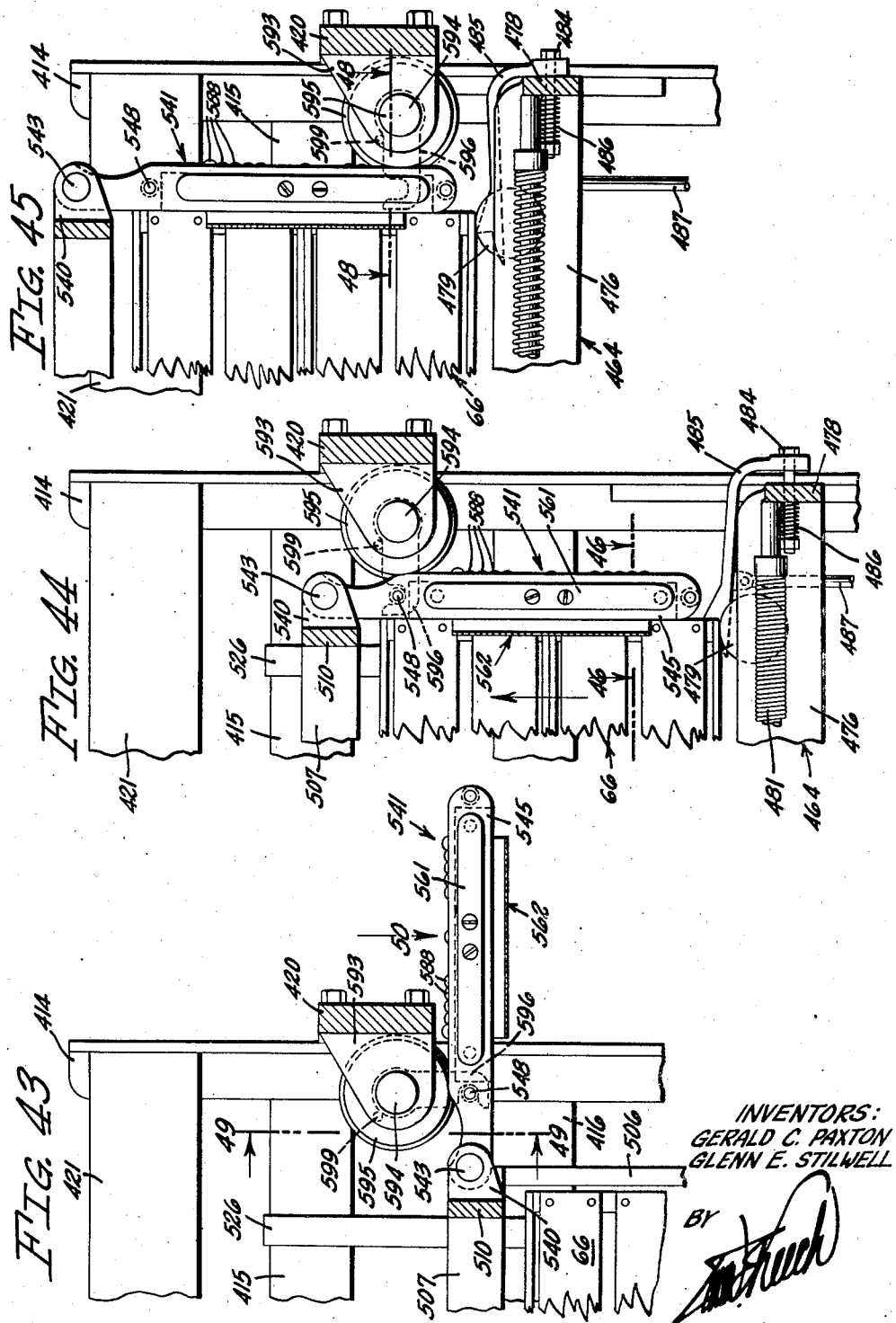
INVENTORS:
GERALD C. PAXTON
GLENN E. STILWELL
BY
ATTORNEY Dec. 7, 1943. G. C. PAXTON ET AL 2,336,287
APPARATUS FOR MATCHING MULTIPLE BOXES
Filed Aug. 1, 1940  20 Sheets-Sheet 19
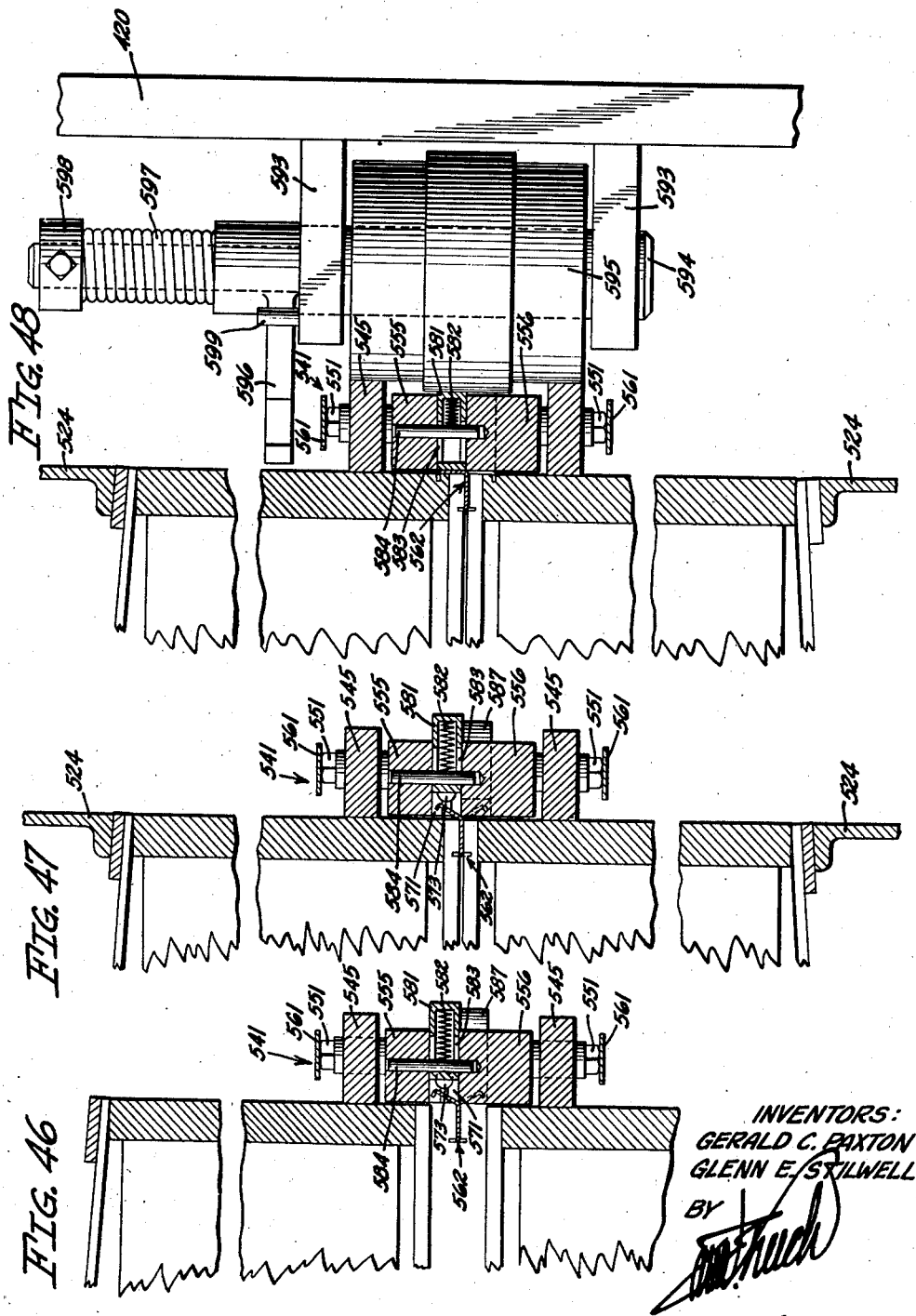
INVENTORS:
GERALD C. PAXTON
GLENN E. STILWELL
BY
ATTORNEY

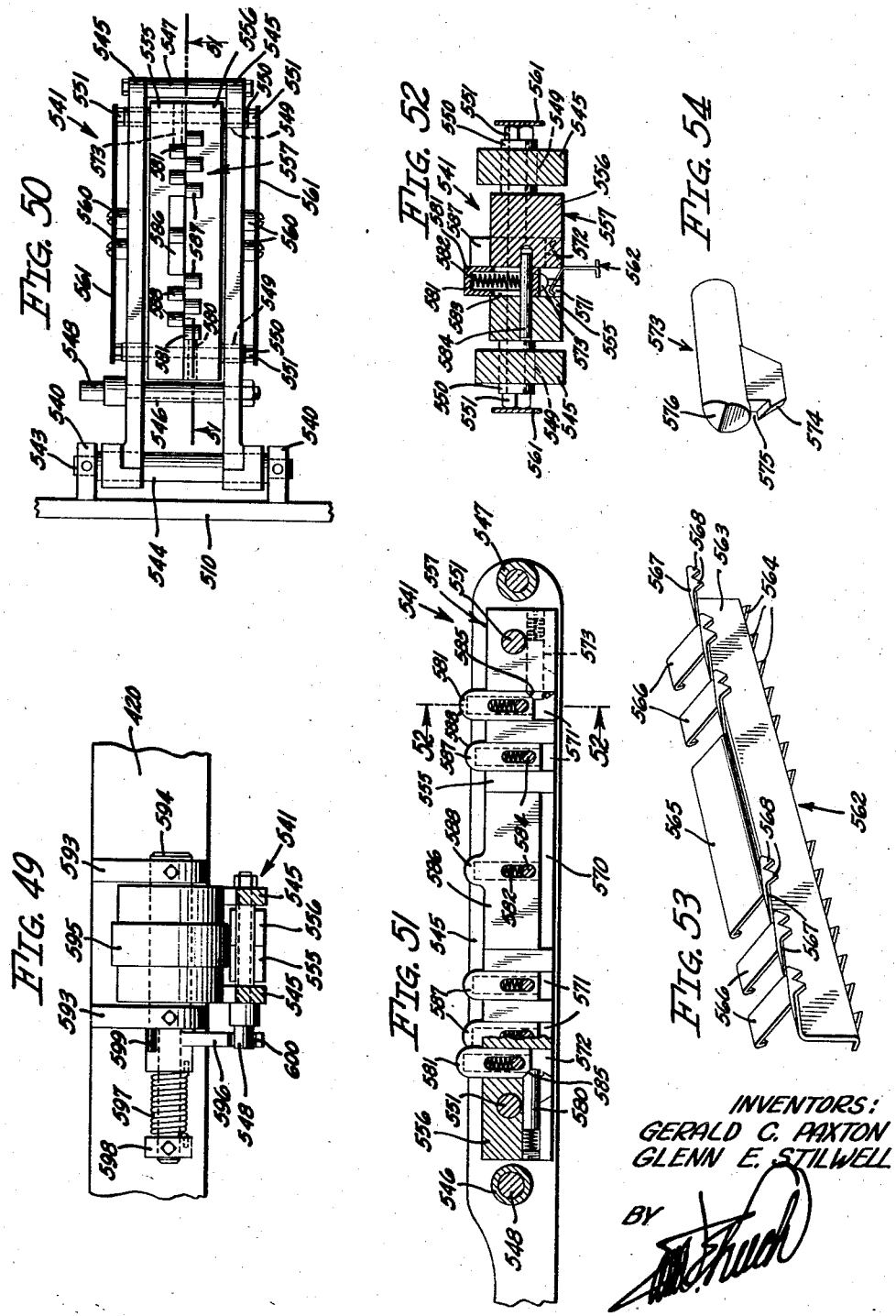

Patented Dec. 7, 1943

2,336,287

UNITED STATES PATENT OFFICE 2,336,287

APPARATUS FOR MATCHING MULTIPLE BOXES

Gerald C. Paxton and Glenn E. Stilwell, Riverside, Calif., assignors to Food Machinery Corporation, San Jose, Calif., a corporation of Delaware Application August 1, 1940, Serial No. 349,098

19 Claims. (Cl. 214—1)

This invention relates to the packaging art and more particularly to packaging a given product in compound multiple boxes. It is particularly useful in the packaging of products in multiple boxes where a number of different products or classes, grades, or sizes of one product are first packed in individual subordinate box units and said units later bound together to form a multiple box.

In this situation, it is desired that the produce contained in the individual units bound together in a single multiple box have a certain relation with each other. For instance, if oranges are being packed in the individual box units, a given size to each unit, and a half dozen or more sizes are being packed, so that each unit, when lidded, contains any one of these sizes, it is preferable to match the individual box units after they are lidded and before they are bound together so that the oranges in each of the units bound together will be of the same size.

It is an object of this invention to provide a novel and efficient method and apparatus for lidding individual box units and then binding these together in which said units are matched in accordance with some predetermined relation prior to being bound together.

It is a further object of the invention to provide a method of and apparatus for lidding individual box units and then binding these into multiple boxes in which an operator may be required for the lidding and binding operations, but in which the matching operation is accomplished automatically.

It is a still further object of the invention to provide a novel apparatus for lidding individual boxes and matching said boxes for being bound together in multiple boxes, said apparatus being adapted to be run by a single operator.

It is another object of our invention to provide an apparatus for matching packages which will receive said packages without regard to order, will place each package in reserve when a matching package is not already in reserve, and will, when such a matching package is present in reserve, discharge the same together with the package just received.

Another object of the invention is to provide a box positioner which operates automatically upon delivery thereto of a pair of boxes which constitute units of a multiple box, to rotate said boxes into the proper position relative to each other so that their bottoms are placed together in readiness for said boxes to be bound to produce such a multiple box.

A still further object of the invention is to provide a novel apparatus for the binding together of a pair of boxes to form a multiple box.

Yet another object of the invention is to provide, in a box binding machine, a novel mechanism for binding together two boxes to form a single multiple box by the application thereto of a pair of box clasps of a particular type disclosed in copending application of Walter Hale Paxton, deceased, Geraldine Paxton and H. S. Nicks, executors, Serial No. 332,321, filed April 29, 1940, and entitled "Package clasp".

Further objects and advantages will be made manifest in the following description taken in connection with the accompanying drawings, in which:

Fig. 1 is a diagrammatic side elevational view of a preferred embodiment of the apparatus of the invention.

Fig. 2 is a diagrammatic horizontal sectional view taken on the line 2—2 of Fig. 1.

Fig. 3 is a perspective view of a half box of the type which the preferred embodiment of the apparatus of the invention is especially adapted to lid, match, and bind together to produce multiple boxes.

Fig. 4 is a perspective view illustrating a multiple box of the type which the invention is especially adapted to produce.

Fig. 5 is a side elevational view of the matcher of the invention with the housing removed therefrom.

Fig. 6 is a fragmentary detail view taken in the direction of the arrow 6 of Fig. 5.

Fig. 7 is a transverse sectional view taken on the line 7—7 of Fig. 5.

Fig. 8 is a fragmentary side elevational view taken in the opposite direction of Fig. 5 as indicated by the arrow 8 in Fig. 7.

Fig. 9 is a diagrammatic transverse sectional view taken on the line 9—9 of Fig. 5 and illustrating the electric commutator of one of the magazines of the box matcher.

Fig. 10 is a wiring diagram illustrating the electrical system by which the box matcher of our invention is operated.

Fig. 11 is a longitudinal sectional view taken on the line 11—11 of Fig. 7 with the working parts of the matcher of our invention positioned as when commencing operations with the matcher empty of boxes.

Fig. 12 is an enlarged detail cross-sectional view taken on the line 12—12 of Fig. 11 and illustrating the stop for the second of the two magazines in said matcher.

Fig. 13 is a view similar to Fig. 11 and illustrating the situation which exists when the elevator of the lidder of said apparatus starts upward in a lidding operation.

Fig. 14 is a view similar to Fig. 13 and illustrates the situation which exists when the elevator of the lidder returns downward with a lidded box and ejects the latter into said matcher with the stops of the matcher set to stop the box in the first magazine of the matcher.

Fig. 15 is a view similar to Fig. 14 and illustrates the halting of a box in the first magazine as aforesaid.

Fig. 16 is a view similar to Fig. 15 and illustrates the next step in the operation of the matcher of the invention in which the lidder elevator rises to begin another lidding operation with the result that the box just delivered to the first magazine is freed by the relative movement between the delivery conveyor and the first magazine to bring said box to rest in the uppermost receptacle of said first magazine and thus free said first magazine for rotation to place said box in reserve.

Fig. 17 is a view similar to Fig. 16 and illustrates the situation in which a box has just been lidded and is about to be delivered from said matcher and in which the first magazine of said matcher contains a box matching the box about to be so delivered, the matcher being shown set in this figure for the delivery of the matched boxes along the matcher conveyor entirely through the latter.

Fig. 18 illustrates the delivery of said pair of matched boxes through said matcher as aforesaid.

Fig. 19 is a plan view of a box positioner of the invention.

Fig. 20 is a detail sectional view taken on the line 20—20 of Fig. 19 illustrating the box diverting mechanism in a given position.

Fig. 21 is a view similar to a portion of Fig. 19 and illustrating the box diverting mechanism positioned to divert a box in the opposite direction from that shown in Fig. 19.

Fig. 22 is a vertical longitudinal sectional view taken on the line 22—22 of Fig. 19 showing the drive mechanism for the box positioner.

Fig. 23 is a transverse sectional view taken on the line 23—23 of Fig. 22.

Fig. 24 is a diagrammatic horizontal sectional view taken on the line 24—24 of Fig. 22 and illustrating the position of the control mechanism of the positioner when a single box is entering said positioner.

Fig. 25 is a fragmentary view similar to Fig. 24 and illustrates the situation as to the positioner control mechanism when said single box is stopped in said positioner.

Fig. 26 is a view similar to Fig. 25 and illustrating the situation as to the control mechanism of the positioner when two boxes enter and are stopped in said positioner.

Fig. 27 is a wiring diagram for the control mechanism of the positioner which permits the operator to allow a single box to go through this when desired.

Fig. 28 is a transverse sectional view taken on the line 28—28 of Fig. 19 and illustrates the box rotating mechanism on the positioner at the time when two boxes are first delivered to the positioner.

Fig. 29 is a fragmentary diagrammatic perspective view illustrating the reciprocating cross head of the box positioner of the invention.

Fig. 30 is a view similar to Fig. 28 and illustrates the elevation and rotation of the two boxes in the positioner into the relation in which said boxes are to be bound together.

Fig. 31 is a view similar to Fig. 30 and illustrates one phase of the return of the box rotating mechanism of the positioner to its normal position.

Fig. 32 is a view similar to Fig. 31 and illustrates another phase in the return of the box rotating mechanism to its normal position, the latter being shown in Fig. 28.

Fig. 33 is a fragmentary detail view of a roller trap device of said positioner.

Fig. 34 is a detail view of Fig. 33 taken in the direction of the arrow 34.

Fig. 35 is a side elevational view of the box binder of the invention.

Fig. 36 is a horizontal sectional view constituting substantially a plan view of said binder and is taken on the line 36—36 of Fig. 35.

Fig. 37 is a detail sectional view of the accumulator for delivering boxes from the positioner to the binder and is taken on the line 37—37 of Fig. 36.

Fig. 38 is an enlarged diagrammatic detail view taken on the line 38—38 of Fig. 37.

Fig. 39 is a cross-sectional view taken on the line 39—39 of Fig. 35 and illustrating a pair of matched boxes in the binder ready to be operated upon by the latter.

Fig. 40 is a view similar to Fig. 39 illustrating the elevating table of the binder in uppermost position at the completion of a binding operation on said boxes.

Fig. 41 is a longitudinal sectional view taken on the line 41—41 of Fig. 39.

Fig. 42 is a view similar to Fig. 41 and is taken on the line 42—42 of Fig. 40.

Fig. 43 is an enlarged sectional detail view taken on the line 43—43 of Fig. 39 and shows a clasp applicator of the binder as positioned at the beginning of a binding operation.

Fig. 44 is a view similar to Fig. 43 and illustrates the clasp applicator of the invention as when first swung inwardly to insert a clasp between the two boxes to be bound together.

Fig. 45 is a view similar to Fig. 44 and illustrates the clasp applicator at the completion of a binding operation.

Fig. 46 is an enlarged cross-sectional detail view taken on the line 46—46 of Fig. 44 where the clasp is shown as when first inserted between the two boxes to be bound together.

Fig. 47 is a view similar to Fig. 46 illustrating the next step in the binding operation where the two boxes are forced together to impale the bottoms of the boxes on the clasp.

Fig. 48 is an enlarged fragmentary view taken on the line 48—48 of Fig. 45 and showing the completion of the application of the clasp to the two boxes to bind these together.

Fig. 49 is a fragmentary sectional detail view taken on the line 49—49 of Fig. 43 and illustrates the spring mechanism for engaging and holding the clasp applicators in upward position in the intervals between binding operations.

Fig. 50 is a plan view of one of the clasp applicators of the invention.

Fig. 51 is an enlarged longitudinal sectional view taken on the line 51—51 of Fig. 50 showing the interior construction of one of the clasp applicators of the invention.

Fig. 52 is a cross-sectional view taken on the line 52—52 of Fig. 51 and illustrating the manner in which the clasp driving punches are mounted in the applicator, as well as showing how a clasp is yieldably supported in the applicator.

Fig. 53 is a perspective view illustrating a preferred form of clasp applied by the binder of the invention.

Fig. 54 is a perspective view of a yielding clasp supporting latch employed on the clasp applicator of the invention.

Conventionally shown in Figs. 1 and 2 and designated by the numeral 60, the apparatus of the invention includes a lidder 61, a matcher 62, a positioner 63, and a binder 64.

While the method and apparatus of this invention is suitable for operation on packages of various kinds, they have been found especially adapted for lidding, matching, and binding together half boxes to form these into multiple boxes of the type disclosed in copending application of Hale Paxton, Serial No. 188,910, filed February 5, 1938, on a Multiple box. The invention will accordingly be described herein as adapted for this purpose.

A multiple box 65 of the type aforesaid is illustrated in Fig. 4 of the drawings. This box is formed by lidding, matching, positioning, and binding together two half boxes 66 as shown in Fig. 3. Each of the half boxes 66 is preferably made up of two sections 71 which are joined together by placing these sections alongside each other and uniting their abutting ends as by clasps 72. Each of the box sections 71 includes ends 73, center partitions 74, these ends and partitions having secured thereto bottom slats 75, inner side slats 76, and outer side slats 77. By this construction, two box units 78 are provided in each section 71. The outer side slats 77 are provided with scorings 79 which are formed along the line on which the units 78 come together. Prior to the assembly of the sections 71, the inner side slats 76 and the bottom slats 75 are severed in the planes of the scorings 79. Thus, when the sections 71 are separated, by removing the clasps 72, for the purpose of dis-assembling the half box 66, it is possible, by swinging the units 78 relative to each other about the lines of the scorings 79, to fracture the unsevered portions of the slats 77 and thus completely separate the units 78.

The half boxes 66 are preferably lidded by the Lid for multiple box and method of applying the same disclosed in copending application of Walter Hale Paxton, deceased, Geraldine Paxton and H. S. Nicks, executors, Serial No. 332,320, filed April 29, 1940, now Patent No. 2,317,478, issued April 27, 1943. As shown in Figs. 3 and 4, this lid 80 is made up preferably of four straight-grained thin wooden slats 81 bound together by nailing or stapling end cleats 82 and a central cleat 83 to these slats. The cleat 83 is twice as wide as the end cleats 82 and is weakened along its central axis by a saw cut 84 which extends vertically entirely through cleat 83 but stops short of the ends of the cleat. The slats 81 are entirely severed as by saw cuts 85 in the plane of the saw cuts 84. The cleats 82 and 83 are weakened along the longitudinal axis of the lid 80 by scorings 86 and 87.

The half boxes 66 are first packed with fruit F so that this extends above the upper ends of the box, this fruit being placed in accordance with a predetermined pattern in each of the four units 78. As many as eight sizes of fruit are packed in these boxes, and it is preferable that all the fruit in each of the half boxes 66 and in each of the whole boxes 65 be of the same size. Because of packing conditions, however, the boxes 66 are delivered indiscriminately as to size of fruit contained therein to the lidder 61.

The lidder 51

This lidder preferably follows the disclosure in U. S. Letters Patent to Hale Paxton, et al., No. 2,084,048, issued June 15, 1937, with the addition of a central chuck beam 90 and a nail supply means 91 which is operated in the same manner as the end nailing chuck beams 92 when a box 66 is lifted by the lidder elevator 93 as described in said patent. As the box rises with the elevator 93 with the lid 80 disposed between said box and the chuck beams 90 and 92, these chuck beams engage the center cleat 83 and end cleats 82 respectively of the lid and press these down onto the ends and center partitions 74 of the box 66 and drive nails through these cleats into these ends and partitions to lid the box 66 as it appears in Fig. 3.

Provided on the lidder 61 is an indicating device 95 which is adapted to be actuated by the individual operating the lidder for controlling the matcher 62 as will be made clear hereinafter. The indicator 95 (Fig. 5) includes a dial 96 carrying a series of fruit size indicating indicia 97. Mounted to sweep the dial 96 is a hand 98 which is operatively connected with a matcher operating switch 99 associated with the indicating device 95.

As shown in the aforesaid Letters Patent, the elevation of the elevator table 93 (Figs. 1 and 5) in the lidder 61 is brought about by rotating a control shaft 100 in the direction of the arrow 101. This shaft has a short arm 102 which closes a normally open switch 103 when the shaft 100 is rotated to start the lidder elevator 93 upwardly.

The matcher 62

The matcher has a frame 107 (see Figs. 1, 2, 5 and 7) including end plates 108 and 109 which are held rigidly in spaced relation by spacer shafts 110 and 111 and base beams 112. At their lower edges, the plates 108 and 109 are provided with angle iron shoes 113. The shafts 111 extend through bosses 115 provided in a central bearing supporting wall 116 which is provided with bearings 117. The frame 107 also includes a channel iron member 120 which unites the upper end portions of the end walls 108 and 109.

Provided on the end wall 108 are bearing brackets in which a shaft 122 is journalled, this shaft having a short arm 123 positioned to actuate a normally open switch 124. The end walls 108 and 109 have conveyor openings 125 and 126 (see Figs. 6, 7, and 11). Provided on shaft 122 and extending inwardly into the opening 125 are the inner arms 127 of a conveyor elevating and depressing lever 128, the outer arm 129 of this lever extending underneath the lidder table 93 and being normally held down so as to elevate the arms 127 as shown in Fig. 11.

Journalled in the bearings 117 and in bearings 130 on the end plates 108 and 109 are shafts 131 and 132. Mounted on these shafts are rubber tired wheels 133. Disposed within the same vertical planes as the wheels 133 and mounted for vertical adjustment on the frame channel iron 120 are rollers 134.

Having chain and sprocket connections 140 with the respective shafts 131 are geared reversible electric motor units 141 and 142.

Rotatably mounted on the wheels 133 is a pair of half box magazines A and B which are substantial duplicates of each other. Each includes a pair of annular channel rings 143 and 144, the latter being disposed toward the center of the matcher, the channels in these rings facing outwardly and receiving the wheels 133 and rollers 134. Connecting the rings 143 and 144 is a series of five sheet metal wall assemblies 145 having inwardly disposed flanges 146 and producing, in the spaces disposed circumferentially between adjacent assemblies 145, a series of five box receiving chambers 147. One of these chambers in each of these magazines is used exclusively as a passageway for boxes traveling through this particular magazine without halting therein, these chambers in the two magazines being referred to respectively hereinafter as chambers $Oa$ and $Ob$. The other chambers 147 are identified to correspond with the various indicia 97 on the dial 96. For purposes of the present disclosure, these indicia comprise numbers from 1 to 8 and the chambers in the magazines A and B are identified with these numbers as indicated in the wiring diagram in Fig. 10.

The outer portion of each assembly 145 is cut away in a plane disposed intermediate of the rings 143 and 144 and is provided with a pair of bars 148 against which an endless chain 149 rests, there being one of these chains which entirely encircles each of the magazines A and B. Rigidly fixed on the frame channel member 120 as shown in Figs. 5 and 7 in opposite sides of the plane of each of the chains 149 are plates 150 having shafts 151 journalled between the lower extremities. Rotatable on these shafts are sprockets 152 and arms 153 on which are rotatably mounted other sprockets 154, the chain 149 being trained around these sprockets as shown in Fig. 7. Attached to the bars 110 and the arms 153 so as to swing the latter outwardly and maintain the chains 149 under a tension, are contractile springs 155.

Fixed by suitable insulation supports upon the frame rings 143 of magazines A and B are commutator rings 156 and 157.

These commutators are identical in construction, each having a piece of insulating material 158. The commutator 156 has inner and outer conductor segments 159 and 160 which do not overlap and which are separated at their lower ends when in normal position as shown in Fig. 10 by a dead space 161. The commutator 157 has inner and outer conductor segments 162 and 163, these being separated at their lower ends when normally positioned as shown in Fig. 10 by a dead space 164.

Brushes serving various purposes are mounted on the frame of the matcher 62 for engagement with the commutators 156 and 157. Of these, four brushes $c$ bear against the outer surface of the commutator ring 156 and are joined together by a wire 165, the object of the brushes $c$ being to always maintain contact with the external segment 160. Four brushes $d$ contact the inner surface of the commutator 156 and are connected together by a wire 166 so as to always maintain electric connection between this wire and the inner conductor segment 159. Equally spaced about the ring 156 and bearing thereagainst so as to engage either of the segments 159 or 160 which may be opposite each of these, is a series of brushes $e0$, $e1$, $e2$, $e3$, and $e4$.

An identical group of brushes as just described for the ring 156 is provided at the opposite end of the matcher 62 for contacting the commutator ring 157. Of these, four brushes $f$ are spaced about the ring 157 and contact the outer surface thereof so that one of these brushes is always in contact with the external conductor segment 163 of this ring, these brushes being all connected to a wire 170. Four brushes $g$ are spaced about the interior of the ring 157 and are connected by a wire 171 so that this wire is maintained in continuous communication with the internal conductor segment 162.

Equally spaced about the ring 157 are five brushes $h0$, $h5$, $h6$, $h7$, and $h8$, each of these brushes being positioned to contact either segment 162 or 163 whichever may be opposite the position of this brush.

The wiring of the matcher 62 is diagrammatically shown in Fig. 10. This includes the control switch 99, the contact arm 172 of which is mounted coaxially and rotates together with the handle 98 on the indicator 95 as shown in Fig. 5. The switch 99 has neutralizing segments 173 and 174 and a series of eight contacts numbered $k1$ to $k8$. The switch arm 172 may be positioned to engage both the segments 173 and 174 to cause the magazines A and B to be neutralized with their chambers $Oa$ and $Ob$ disposed upwardly as shown in Fig. 10. When the arm 172 is positioned to engage any one of the contacts $k1$, $k2$, $k3$, or $k4$, this arm is also in engagement with the segment 174. When the arm 172 is disposed to engage any one of the contacts $k5$, $k6$, $k7$, and $k8$, said arm is also in engagement with the segment 173.

The motor 141 is provided with a forward switch 180 which is controlled by a magnetic relay 181 and a reverse switch 182 which is controlled by a magnetic relay 183. The motor 142 is provided with a forward switch 184 which is controlled by a magnetic relay 185 and a reverse switch 186 which is controlled by a magnetic relay 187. The motors 141 and 142 have magnetic brakes 188 and 189 each of which is automatically set when its motor is de-energized.

Electricity is supplied through main wires L1, L2, and L3 to each of the switches 180, 182, 184, and 186. L1 also leads to one terminal of each of the magnetic relays 181, 183, 185, and 187, the other terminals of said relays connecting respectively to wires 165, 166, 170, and 171. L2 leads through a switch 190 and through switches 103 and 124, disposed in parallel, to the switch arm 172.

Segment 173 is connected by a wire 191 to the brush $e0$. Segment 174 is connected by a wire 192 to the brush $h0$. Switch contacts $k1$, $k2$, $k3$, and $k4$ are connected respectively to brushes $e1$, $e2$, $e3$, and $e4$. Switch contacts $k5$, $k6$, $k7$, and $k8$ are connected respectively to brushes $h5$, $h6$, $h7$, and $h8$. For the purpose of keeping the commutator rings 156 and 157 clean, felt wipers 195 are provided at each end of the matcher 62 to wipe these commutator rings as they rotate in the operation of the matcher.

The matcher 62 also includes a conveyor 200, the forward end of which is supported on the frame 201 of the box positioner 63, as clearly shown in Figs. 1, 2 and 19. This frame includes a cross bar 202 having bearing brackets 203 in which is journalled a shaft 204 which is continually rotated by a means which will be described hereinafter. The conveyor 200 has a frame 205 comprising rigidly spaced channel members 206, the forward end of which is pivotally supported on the shaft 204. This shaft is provided with chain driving sprockets 207 and similar chain driven sprockets 208 are provided on a shaft 209

(Figs. 13 and 14) mounted at the opposite end of the conveyor. Endless conveyor chains 210 are trained about the sprockets 207 and 208 so that the upper flights of these chains rest upon the channel members 206 (Fig. 12) as they travel from the lidder 61 toward the positioner 63.

Mounted in the conveyor frame members and extending laterally therefrom as shown in Fig. 7 is a bar 215, the extending ends of this bar resting on the aforesaid arms 127 which provide support for this end of this conveyor 200 when it is in its normal upward position as shown in Figs. 1, 5, 11, 14, 15, 17, and 18.

The normally closed switch 190 referred to in describing the wiring diagram of Fig. 10 is mounted on the conveyor 200 as shown in Fig. 11 and the other operation views. To control this switch so as to open it whenever a box is entering or leaving the matcher 62, or passing from magazine A into magazine B, three levers 216, 217 and 218 are pivotally mounted on the conveyor and their lower ends connected by linkage 219 to a rod 220 which slides through a fixed bearing 221 and is held by a spring 222 in operative contact with the switch 190 so as to hold this closed when the levers 216, 217, and 218 are disposed upright as shown in Fig. 11. Whenever a box travels over any one of these levers, however, it compresses the spring 222 and permits the switch 190 to open, thus rendering the electrical system for rotating magazines A and B inoperative until these levers return to upright positions.

At the discharge end of each of the magazines A and B are provided stop mechanisms 225 and 226. The mechanism 225 includes a stop 227 which is fixed on a shaft 228 pivotally mounted on the conveyor frame channels 206. Fixed on an extending end of the shaft 228 is a forwardly inclined crank 230. Extending in opposite directions from the hub of the arm 227 are arms 231 and 232, from the ends of which pivotally depend rods 233 and 234. These rods extend downward through apertures in a stationary plate 240 fixed on the bearing wall 116. The rod 233 also extends through a hole in a plate 241 provided on the conveyor side channels 206. Adjustably fixed on the rod 233 are collars 242 and 243, and on the rod 234 a collar 244. The positions to which these collars are adjusted on these rods will be explained in connection with the operation. The shaft 228 is frictionally held against rotation by a friction device 245 so that the stop 227 remains in whatever position it may be until the shaft 228 is positively rotated.

The stop mechanism 226 is identical with the mechanism 225 except that in place of the stationary plate 240 it is provided with a similar plate 246 which is fixed to the end wall 109 of the matcher. Other elements of the mechanism 226 will be identified by the same numbers as corresponding elements of the mechanism 225 with prime attached.

Fixed to the bottom face of one of the flanges 146 of the magazine structure forming chamber Oa of magazine A is a stop erector cam 247, this cam being disposed directly over the crank 230 as shown in Figs. 7 and 12. A similar cam 247' is likewise provided on magazine B directly over crank 230'.

*Operation of lidder and matcher*

As above stated, the shaft 204 (Fig. 2) continuously rotated by means to be described hereinafter, this causing the upper flights of chains 210 to move continuously in the direction of the arrows in Fig. 11 so that any boxes resting on these chains are conveyed in the direction of said arrows. Half boxes 66 are packed and delivered to the lidder 61 without any segregation being made between the boxes in which one size of fruit is packed from the boxes in which a different size of fruit is packed. The apparatus disclosed is designed for handling half boxes in which there are eight different sizes of fruit packed in the boxes. Each box is packed with a certain size and the principal object of the invention is to lid these boxes, match them in pairs of half boxes, both of which contain the same size of fruit, position the boxes of each such pair properly for binding, and then bind the half boxes of each such pair together to form a multiple box.

At the commencing of operations, the elevating nailing table 93 of the lidder 61 is in lowered position. Half boxes 66 are fed from a conveyor 250 onto the nailing table as fast as the lidder is able to handle these, one box, of course, being delivered and lidded at a time.

When a box is thus received on the nailing table 93 and positioned in readiness for lidding, the operator notes which size of fruit is contained in the box and turns the indicator handle 98 so that the upper end of this handle points to the number identifying that size of fruit. Then he actuates the control shaft 100 to start the elevating table 93 upwardly, this shaft at the same time closing the switch 103. It is to be noted in the lower right-hand corner of Fig. 10 that switch 190 must be closed and one of the switches 103 or 124 must be closed in order for the electrical mechanism shown in this figure to be operative to rotate one or the other or both of the magazines A and B.

Under the conditions above described as existing at the start of operations, it is to be noted that switch 190 is closed and as the lidder 61 is energized to start the elevator 93 upward the switch 103 is closed.

In Fig. 10, the magazines A and B are shown with their respective box chambers identified by their respective reference characters as they are positioned at the commencing of operations, that is, with the chambers Oa and Ob disposed in uppermost positions.

Before completing the description of a specific example of the operation of the matcher 62, it should be pointed out that the setting of the hand 98 on the indicator 95 to indicate a given size of fruit causes the matcher to operate automatically, while the box referred to by the indicator hand is being lidded, to rotate that one of the magazines A or B having the chamber which is assigned to receive in reserve a box packed with this size of fruit so as to bring this chamber into uppermost position in that magazine. If that chamber is in magazine B, the stop 227 is automatically depressed out of the path of the box and when the box in the lidder has been lidded and the nailing table 93 returns to its downwardmost position, the nailing table contacts the arm 129 and again lifts the conveyor 200 up to level position and the ejector with which the lidder 61 is equipped ejects the box just lidded from the table 93 through the opening 125 and onto the upper flight of the conveyor chains 210. Traveling continuously as they do, these chains carry this box through the chamber Oa in magazine A and into the particular reserve chamber now disposed uppermost in magazine B.

Suppose now the next box lidded is destnied for a reserve chamber in magazine A, and the indicator hand 98 is set correspondingly. When the elevator 93 rises and the matcher is set in operation, magazine A immediately rotates to bring the reserve chamber for which the second box is destined into uppermost position and magazine B automatically rotates to carry the first box into reserve and to bring the chamber Ob back into upwardmost position. At the same time, the stop 227 is automatically set to stop the second box in magazine A when it is discharged from the lidder onto the conveyor chains 210.

Suppose now that the third box lidded carries the same size of fruit as the first box lidded and which was delivered to magazine B. Before starting to lid the third box, the operator turns the indicator hand 98 to indicate the size of fruit of the third box. Thus, when he starts to lid the third box the matcher is set in operation to rotate magazine A back to neutral where the chamber Oa, used exclusively as a passageway, is uppermost, and magazine B is automatically rotated to bring the chamber uppermost which contains the first box lidded. At the same time, it causes stop 227' to be extended upwardly at an angle so that, when the conveyor 200 is lifted at the conclusion of the lidding of the third box, stop 227' is disposed beneath the first box lidded, which depresses this stop so that when the third box lidded is ejected onto the conveyor 200 this conveyor carries the first and third boxes out of the matcher in tandem order through the opening 126 in the wall 109 and delivers these boxes to the positioner 63.

If, on the other hand, the third box received in the lidder had contained the same size of fruit as the second box which had been delivered to magazine A, and if, before lidding the third box the operator had just allowed the indicator hand 98 to remain at the same place on the dial 95 as when lidding the second box, the operation of the lidder would then cause no rotation of either magazine A or B except that at the conclusion of the lidding operation the stop 227' would be down as shown in Fig. 11 and the stop 227, during the depression of the conveyor, would be cocked at an angle as shown in Fig. 16 so that as it comes upwardly it would be deflected downwardly by the second box (Fig. 17). Under these circumstances, the chains 210, as the conveyor rises, pick up the second box from the magazine A and convey it on through the balance of the matcher followed by the third box, these two boxes being packed with the same size of fruit and thus being matched for forming a whole multiple box.

The general mode of operation of the matcher above described is accomplished by the following details of operation: Each time the conveyor 200 is lowered at the start of a lidding operation, the collars 243 and 244 of the stop mechanism 225 engage the plate 240 as shown in Fig. 13 so as to cock the stop 227 in a forward direction. This stop is thus positioned to engage and stop a box which may be delivered against it by the chains 210 after the conveyor has been again lifted, or it is in a position to be depressed if when the conveyor is again lifted this stop is disposed beneath a box which has remained as delivered to an upwardly disposed chamber of magazine A as in the last example mentioned in the above general discussion of the operation. Coming up against the bottom of such a box, the stop 227 is depressed by contact with this box (Fig. 17) so as to offer no impedance to this box being carried with the moving chains of the conveyor when the weight of the box has been transferred to these chains by the elevation of the conveyor.

Each time the conveyor 200 is lowered, the stop mechanism 226 responds in the same way as just described for the stop mechanism 225 and with the same results with respect to the magazine B. If, at any time, in either magazine A or B chamber Oa or Ob respectively is disposed upwardly at the time the lidding operation is completed and the conveyor is lifted to normal position, this brings the cranks 230 and 230' of the two stop mechanisms 225 and 226 into engagement with the cams 247 and 247' which it is to be noted are mounted only on the adjacent flange 146 of these particular chambers Oa and Ob. As the cranks 230 and 230' extend forwardly from the shafts 228 and 228' respectively, they respond to engagement with the cams 247 and 247' by swinging the stop 227, or the stop 227', or both, as the case may be, downwardly so that any box being conveyed by the chains 210 through the magazine in question will not be stopped but will continue on through that magazine.

Figs. 10, 11, 13, 14, 15, 16, 17, and 18 clearly illustrate a specific example of the general mode of operation of the matcher 62 described hereinabove. In this example it will be assumed that two boxes identified as box X and box Y of "No. 4" size are delivered consecutively to the lidder 61. When the first of these boxes is received in the lidder, the hand 98 of the indicator 95 is manually turned to point to the numeral 4 on the dial. This turns the contact arm 172 of the switch 99 as shown in Fig. 10. The various box receiving chambers of the magazines A and B are now disposed as indicated diagrammatically in Fig. 10. When the lidder elevator starts up, thus lowering the front end of the conveyor 200, both the stops 227 and 227' are cocked forwardly at an angle as shown in Fig. 13 by the engagement of the collars 243 and 244 with the plate 240 and of the collars 243' and 244' with the plate 246.

When the switch 103 is first closed by starting the elevator 93 upward, current is supplied from the main line L2 through the switch 100, the switch 103, the arm 172 of the switch 99, the segment 174 and the wire 192 to the brush h9 which at that time is contacting the dead space 164 of the commutator ring 157 of magazine B. The current thus supplied therefore accomplishes no change in the position of the magazine B. However, current is also supplied from the contact arm 172 through the contact k4 to the brush e4 which at that time is in contact with the outer segment 160 of the commutator ring 156. The electricity flows from this segment through the brushes c and the wire 165 to the magnetic relay 181 of switch 189 of the motor 141. This starts this motor, causing it to rotate the magazine A in a forward direction which rotates the commutator ring 156 in the direction of the arrow 251 in Fig. 10. The rotation of the magazine A continues until the dead space 161 comes opposite the brush e4 so as to deenergize the relay 181 and stop the motor 141. The brush e4 is so placed with relation to the commutator ring 156 that when the dead space 161 reaches this brush the box receiving chamber 4 of the magazine A will be disposed in upwardmost position ready to receive a box from the conveyor 200.

When the lidder table 93 returns downward it lifts the conveyor 200 to normal position and the box X ejected onto the conveyor depresses the arm 216 as it enters the matcher, thus rendering the magazine rotating mechanism inoperative by opening the switch 190. Engaging stop 227, box X rocks this into vertical position with collar 242 engaging the bottom of plate 241, thus stopping box X in chamber 4 as shown in Fig. 15.

Following the lidding of box X and its discharge as above described into the matcher, box Y is received in the lidder and lidded. Obviously, if no change is made in the position of the contact arm 172 while box Y is being lidded, there will be no change effected in the position of either of the magazines A and B during the lidding of box Y. As shown in Fig. 16, box X is left suspended upon the flanges 146 of chamber number 4 of magazine A when the conveyor is lowered and the cocking of the stop 227 by the lowering of the conveyor as already described brings this stop up beneath box X as shown in Fig. 16 so that with the lowering of the lidder table at the completion of the lidding of box Y and the consequent elevation of the conveyor again the stop 227 engages the bottom of box X (Fig. 17) and is depressed out of the way of interfering with this box being conveyed out of the matcher. Stop 227' is depressed by its crank 239' as shown in Fig. 17 by its crank engaging cam 247', owing to the fact that in magazine B the chamber Ob is now disposed uppermost. The way is thus clear from obstruction when box Y is ejected from the lidder onto the conveyor 200 for this box to follow box X through the matcher and on toward the box positioner 63, as shown in Fig. 18.

It is to be noted that the direction of rotation of either of the magazines depends upon whether or not the brush energized is at that time in contact with the inner or the outer contact segments of the commutator ring of that particular magazine. If it is in contact with the inner segment, the motor driving that magazine is rotated in reverse direction, that is, in the direction of the arrows 252 and 254; but if the brush energized is in contact at the time with the outer segment of that commutator ring, the motor driving the magazine under discussion will be rotated in a forward direction, thus rotating this magazine in the direction of the arrows 251 and 253. This arrangement always causes each magazine when rotated to be turned the shortest distance necessary to bring the desired box receiving chamber into uppermost box receiving position.

When it is desired that any one or more boxes delivered to the matcher 62 be carried entirely through the matcher on the conveyor 200, the indicator arm 98 is turned to 0 on the dial 96 (Figs. 5 and 10) which causes the switch arm 172 to contact the segments 173 and 174 at its opposite ends. This results, when the lidder is started in operation, in the energizing of brushes e0 and h0, thereby either retaining the magazines A and B in normal position as indicated in Fig. 10, or returning these magazines to these positions with chambers Oa and Ob disposed upwardly.

The reason for employing parallel normally open switches 103 and 124, the closing of either of which renders the magazine rotating system operative, is to start the operation of said system immediately upon the initiation of a lidding operation in the lidder 61. Thus, the time which elapses between the initiation of the upward travel of the nailing table 93 and the closing of the switch 124, may be utilized for starting any changes necessary in the disposition of the magazines A and B. When the nailing table 93 arrives at its uppermost position, the operator releases his control of the shaft 100 on the lidder, whereupon the switch 103 returns to its normally open condition. The switch 124, however, is still closed and remains so until the downwardly returning table 93 engages the lever arm 129 and thereby opens switch 124. The magazine rotating system is thus operative during the entire period of each lidding operation, except for such portion thereof as boxes traveling on the conveyor 200 are depressing one or the other of levers 216, 217, and 218.

In claiming the invention any box may be said to "match" another box if the two boxes contain the same kind and size of fruit, it being the function of the method to match these boxes together and position them bottom to bottom, and bind them into a single unit. Any box may therefore be referred to, as far as its relation to another box is concerned, as a "matching" box and the process of bringing two boxes which match each other together may be referred to as a "matching" of said boxes. Two boxes which are thus suitable for being bound together in a single package may also be referred to as "matched" boxes.

In a similar way, by virtue of the fact that the conveyor 200 carries boxes in tandem, it may for this reason be properly referred to in the claims as a "tandem" conveyor, this meaning not that the conveyor itself is tandem in its construction, but that it carries the boxes in tandem fashion, that is, one following the other in a single file. In contradistinction, the term "dual" conveyor may be used in the claims to indicate a conveyor on which the boxes are carried side by side whether or not these boxes be spaced a short distance from each other or be actually in contact with each other, provided that the boxes travel on such dual conveyor beside each other in pairs, as a part of the process of assembling these boxes to be united in such pairs to produce single shipping units.

*The positioner 63*

As already stated, the delivery end of the conveyor 200 is pivotally mounted and supported on bearing brackets 203 provided upon a frame member 202 (Figs. 2 and 19). This member is supported at its opposite ends upon frame side walls 260 and 261. The positioner 63 (Fig. 19) includes an automatic box diverter 262 and a box upsider 263.

The box diverter 262 is mounted on the discharge end of the conveyor 200, as shown in Figs. 19 to 21. It includes box engager wheels 264 and sprockets 265 fixed on the shaft 204. Journalled in suitable bearings 266 provided on the conveyor frame 205, is a shaft 267 on which are fixed crowned box engaging wheels 268 and sprockets 269, the latter being connected by chains 270 to the sprockets 265. For the purpose of driving the conveyor 200 and the box diverter 262, the shaft 204 is provided with a sprocket 271. Fixed on the conveyor frame 205 so as to extend to the upper level of the chains 270, is a pair of cylindrical bars 275. Mounted within the conveyor frame, at a point opposite the bars 275, is a bearing 276 for receiving a spindle 277 of a clevis in which is mounted a roller 279. The lower end of the spindle 277 is provided with an arm 280 and a contractile spring 281 is stretched between the end of the arm 280 and a pin 282 provided on the conveyor frame so that when the spindle 277 is rotated to cock the roller 279 in one or the other of the positions in which it is shown in Figs. 19 and 21 the spring 281 retains the roller in this position. Also mounted within the conveyor frame 205 near the shaft 264 is a bearing 283, the upper end of which is provided with a box dividing guide 284. Journalled in the bearing 283 is a vertical shaft 290, from the upper end of which two arms 291 and 292 diverge at an angle of approximately 90 degrees. Fixed on the lower end of the shaft 290 is an arm 293 which is connected by a link 294 to the spindle arm 280. (See Figs. 20 and 21.)

Besides the side plates 260 and 261 and the bar 202 connecting these, the box positioner frame 201 includes a cross bar 295 (Fig. 22) which is directly below and parallel with the bar 202, a similar pair of bars 296 and 297, and a smaller pair of bars 298 and 299 which are disposed just within and below the bars 202 and 296. The bars 295 and 297 are connected by a longitudinal bar 300, while the bars 298 and 299 are connected by shallow-arched bars 301.

The frame 201 (Figs. 19, 22, 23, 28 and 30) also includes two vertical guide tracks 302 which are fixed to inner faces of the bars 202, 295, 296, and 297, and are disposed centrally of the machine. The tracks 302 are of T cross-section and are connected at their upper ends by straps 303.

Journalled in suitable bearings 304 provided on the walls 260 and 261 and the arched bars 301, are two series of rollers 305 and 306, these rollers having sprockets 307 and 308. (See Figs. 19, 22, and 23.)

Mounted on suitable spacers on the upper edges of the side walls 260 and 261 and lying just inwardly therefrom, are box guide tracks 313 which are disposed opposite the conveyor 200 and diverter 262, and guide tracks 314 which are disposed opposite the box upsider tracks 263.

Mounted on a suitable stud 315 provided on the frame wall 260 is an idle sprocket 316. (See Fig. 22.)

Journalled in bearings 317 provided on the walls 260 and 261 (see Figs. 22 and 24) is a shaft 318 having sprockets 319 and 320 adjacent said walls. Journalled in bearings 321 on the frame side walls is a shaft 322 having sprockets 323 and 324. Journalled in bearings 325 provided on the frame side walls is a shaft 326 on which are fixed sprockets 327 and 328. Journalled in suitable bearings provided on the bar 300 and the side wall 261 is a crank shaft 335, this shaft having a crank arm 336 disposed inwardly of the frame bar 300 and on the opposite side of this bar a sprocket 337 which is adapted to idle on the shaft 335 except when connected thereto by a clutch 338. Pivotally mounted on the bar 300 is a lug 339 having an arm 340 which is held inwardly against the clutch 338 by a spring 341, thus keeping this clutch normally thrown out and permitting the sprocket 337 to rotate without rotating the shaft 335.

Trained about the sprockets 271, 319, 307, and 316, is an endless chain 342 by which rollers 305 and the shaft 264 are rotatably driven from the shaft 318. Trained about the sprockets 308, 320, 328, and 324, is an endless chain 343 (see Fig. 22) by which the shaft 318, the shaft 322, and the rollers 306 are rotatably driven from the shaft 326. Trained about the sprockets 323 and 337 is an endless chain 344 by which the sprocket 337 and clutch 338 are continuously rotated on the shaft 335.

Fixed on the upper faces of the bars 202 and 296 (see Figs. 19, 22, 31, 33, and 34) are trap cams 347 and 348, the latter pair having fixed stops 349 extending upwardly therefrom. Each of these cams is disposed horizontally and has at its outer end a portion 350 which extends downwardly at an angle of about 45 degrees from horizontal and which has, at its outer extremity, a roller trap 351 which is clearly illustrated in Figs. 33 and 34. Each of the traps 351 is adapted to yield inwardly and when released is returned by a spring 352 to its outermost position as shown in Figs. 31, 32 and 33. Disposed in the same vertical plane as the inner edges of the cams 347 and 348 and mounted in the central flanges of the T bars 302 are cams 353. Fixed centrally on the outer faces of the bars 298 and 299 are cams 354, the shape of which is clearly seen in Figs. 28 and 30.

Slidably guided on the T cross-section tracks 302 is a cross head 360 (see Figs. 22, 23, and 29) the latter figure showing this in perspective. The cross head 360 includes a flat bar 361 having gibs 362 at its opposite ends which receive and slide upon the central flanges of the tracks 302. The cross head 360 is normally supported and in the operation of the positioner 63 is vertically reciprocated by a pitman 363, the opposite ends of which are pivotally connected to the middle of the bar 361 and to the end of the crank arm 336. Journalled in bearings 365 on opposite sides of the bar 361 are shafts 366 having box cradling legs 367 extending laterally from their outer ends, endwise play of the shafts 366 being limited by spacing sleeves 368 disposed between the bearings 365 and arms 367. Each of the legs 367 is provided on its opposite faces with inner and outer rollers 370 and 371, while the extremity of each of these legs is turned upward to form a foot 372.

The rollers 370 lie in the planes of the cams 354, while the rollers 371 lie in the planes of the inner edges of the cams 347 and 348 and the cams 353. Mounted on the upper edge of the bar 361 (not shown in Fig. 29 but shown in Figs. 22, 23, 28, and 30) is a sheet metal central box guide 373, this being open at the top so that when in uppermost position it is adapted to receive the frame straps 303 as shown in Fig. 30.

Rotatably mounted in vertical bearings 376 and 377 provided on the cross bars 296 and 297 (Figs. 22, 23, 24 and 25) at opposite sides of the machine, are control shafts 378, each of which has an arm 379 which is disposed to swing so as to actuate one of a pair of switches 380 and 381. The shafts 378 also have arms 382 having pins 383 which extend into slots 384 in a common yoke 385, the latter being connected by a link 386 to the clutch control arm 340. The link 386 has a finger 387 which lies in the path of movement of a pin 388 on the armature 389 of a solenoid 390. Provided on the upper ends of the shafts 378 are box responsive arms 394 and 395. By this mechanism the engagement of one of the arms 394 and 395 individually by a box causes the actuation respectively of the switches 380, or 381 as the case may be, and the cocking of the yoke 385 about its pivotal connection with the link 386. This action is illustrated in Fig. 25. When two boxes travel into engagement with the arms 394 and 395 at the same time, both the switches 380 and 381 are closed and the yoke 385 is bodily moved as shown in Fig. 26 so as to rock the clutch control dog 339 against the action of the spring 341 to throw the single revolution clutch 338 in and cause the shaft 335 to be given a single revolution. The result of this will be made clear hereinafter.

*Operation of positioner 63*

Boxes are only delivered from the matcher 62 in matched pairs and the box diverter 262 diverts one of these boxes onto one side of the positioner 63 and the other one of these boxes onto the other side of the positioner. Assuming parts of the diverter 262 to be related as shown in Fig. 19 when the first of a matched pair of boxes X and Y arrives at the diverter, the first of these boxes (box X, for instance) rides onto the roller 279 which is cocked at such an angle as to deflect this box to the left of the guide 284 and into engagement with the roller control arm 291 which is thus operated to effect a change in position of the roller 279 from that shown in Fig. 19 to that shown in Fig. 21 just as box X leaves contact with this roller. As the box thus travels in a leftward direction off of the conveyor 200, it is supported by the left hand bar 275 and wheels 268 and 264 and is delivered onto the rotating rollers 305 which impel the box along the space between the guides 314 and 373 against the control arm 394. The actuation of this arm has no effect on the clutch 338 as it merely cocks the yoke 385 about its central connection with the link 386 as shown in Fig. 25.

Box Y, the next box of the matched pair, is diverted to the right upon engaging the roller 279 positioned as shown in Fig. 21. In passing the box dividing guide 284, box Y contacts the arm 292 so that just as the box leaves engagement with the roller 279 it accomplishes the swinging of this roller back into the position in which it is shown in Fig. 19.

Box Y is thus delivered onto rollers 306 which carry it into engagement with the arm 395 (Fig. 26). As arm 394 is already engaged by box X, this causes the clutch 338 to transmit a single revolution to the shaft 335. This produces a single vertical reciprocation of the cross head 360 from its lowermost position as shown in Fig. 28 to its uppermost position shown in Fig. 30, and back again. At the beginning of this movement, the rollers 370 are resting on the cams 354 and the rollers 371 are disposed just above the roller traps 351 of the cams 347 and 348. As the cross head 360 slides upwardly, the rollers 371 engage the upper face of the roller traps 351 and ride therefrom onto the inclined end portions 350 of the cams 347 and 348 and thence onto the horizontal portions of these cams. The box cradling legs 367 with their feet 372 are thus brought up underneath the two matched boxes X and Y resting on the rollers 305 and 306 and swing these boxes upwardly to a bottom-to-bottom relation in which a pair of sides of these boxes is disposed upwardly as shown in Fig. 30. With the return downwardly of the cross head 360, the pair of upsided boxes is lowered and comes to rest on its side on the rollers 305 and 306. Being thus removed from behind the stops 349 and control arms 394 and 395, upon coming to rest again upon these continuously rotating rollers these boxes are immediately discharged from the positioner 63.

Fig. 27 is a wiring diagram for the solenoid 390, the purpose or which is as follows:

At the conclusion of operations with the apparatus 60, there are usually some unmatched boxes remaining in magazines A and B of the matcher 62. These boxes have to be fed singly through the positioner 63 and this is accomplished by closing a switch 396 through which current is supplied to the switches 380 and 381 so that when one of these single boxes enters the positioner 63 and engages either of the arms 394 or 395 so as to close switch 380 or switch 381, the solenoid 390 is energized to engage the finger 387 and throw in the clutch 338 for a box upsiding operation. This upsides the single box which, upon its being set down on its side on one of the sets of rotating rollers 305 or 306, is discharged from the positioner by the rotation of these rollers.

The repositioning of the legs 367 as these are shown in Fig. 28, is accomplished as follows:

As the cross head 360 starts down, following the upsiding of a matched pair of boxes, legs 367 hang straight downward as shown in Fig. 30, until the rollers 371 on these legs engage cams 353 which starts to swing these legs outwardly as shown in Fig. 31. After this rotation of the legs 367 has advanced approximately to the point illustrated in Fig. 31, the rollers 370 come into engagement with the cams 354 which continues to swing the legs 367 (Fig. 32) upwardly after the rollers 371 leave contact with the cams 353. The rollers 371 are thus lifted until they engage and swing the roller traps 351 (Fig. 33) inwardly, permitting these rollers to pass above these traps, whereupon the latter return to their outwardmost positions as the legs 367 stop in the positions in which they are shown in Fig. 28 owing to the stopping of the cross head 360 in its lowermost position.

It is unnecessary to provide any control for the pairs of matched boxes fed along the conveyor 200 into the positioner 63 for preventing interference of one pair of these boxes with the pair just in advance thereof.

*The binder 64*

The binder 64 has a frame 410 resting on foundation blocks 411 and including an angle iron base 412 from the corners of which angle iron posts 413 and 414 extend upwardly to be joined together by heavy horizontal longitudinal plates 415 and 416. These plates are yieldably urged inwardly against the posts 413 and 414 by expansion springs 417 coiled about bolts 418 which extend through these springs and suitable apertures in said plates to be threadedly received in holes provided therefore in the posts 413 and 414. The pairs of posts 413 and 414 are rigidly connected together transversely by heavy plates 420. The extreme upper ends of the posts 413 and 414 are also connected together by longitudinal plates 421. Provided on upper portions of the frame 410 are suitable receptacles 422 which are adapted to receive boxes of clasps such as the binder 64 is designed to apply in performing its task.

Connecting the box positioner 63 and the box binder 64 is a dual box accumulator 425 (Figs. 1, 2, 35 and 36) which is preferably of sufficient length to accumulate a half dozen pairs of matched boxes in readiness for the binding operation. This accumulator includes a frame 426 having two side channel members 427, opposite ends of which are attached to the cross bar 296 and to the binder corner posts 413.

At the discharge end of the accumulator 425, the shafts 428 and 429 are journalled in bearings provided on the frame 426, the shaft 429 carrying box speed-up wheels 430 and a sprocket 431 while the shaft 428 carries a sprocket 432 and conveyor chain sprockets 433. The sprockets 433 are disposed within the channel members 427. At the receiving end of the accumulator 425 a shaft 434 is journalled in bearings provided on the frame members 427, the shaft having a drive sprocket 435 and accumulator chain sprockets 436, the latter being in radial alignment with the sprockets 433 and being connected thereto by accumulator chains 437 which are trained about these sprockets. The upper flights of the chains 437 are supported between the sprockets 433 and 436 by guide rails 440. (See Figs. 37 and 38.) Pivotally suspended at regular intervals between the chains 437 are freely rotatable rollers 441, there being short guide tracks 442 near the discharge end of the accumulator for supporting the rollers 441 so as to cause these to accelerate the rate of travel of boxes being carried by the accumulator 425 and about to be discharged therefrom. Trained about the sprocket 435 and the sprocket 327 on the shaft 326 of the positioner 63, is a chain 443 by which the conveyor 200 and the positioner 63 are driven through the accumulator 425.

Mounted on the corner posts 413 of the binder 64 is an electric motor 444 connected by an enclosed reduction gear 445 to a drive sprocket 446 which, together with sprockets 432 and 431 are encircled by a chain 447 so that the motor 445 drives the accumulator 425 and the other apparatus connected thereto as aforestated.

Supported at one end on the adjacent vertical guide track 392 and at the other end by a spacing bar 448 at the discharge end of the accumulator 425, is a division rail 449 for preventing interference of boxes on one side of the accumulator with the boxes matched therewith on the other side of the conveyor. Supported between arms 450 on a shaft 451 journalled in the accumulator frame side members 427 adjacent the binder 64 are stop rollers 452.

These stop rollers are held in box stopping position by springs (not shown) and are adapted to be depressed out of box stopping position by a foot pedal 460 on a shaft 461, the latter being journalled on the base 412 and having an arm 462 connected by a link 463 to one of the stop roller supporting arms 450.

The binder 64 accomplishes its binding operation by successively receiving matched pairs of boxes on an elevating table 464 and through the operation of an elevating mechanism 465 controlled by a pedal 466, reciprocating this table vertically, returning downward with these two matched boxes completely bound together to form a whole multiple box 65 as shown in Fig. 4.

The elevating and control mechanism 465 (Figs. 39 and 40) and pedal 466 may be identically like the table elevating and control mechanism disclosed in the aforesaid U. S. Letters Patent to Paxton, et al., #2,084,048. When the pedal 466 is depressed, this mechanism causes the table 464 to rise, and when pressure is released on the pedal 466 the table 464 is returned downwardly under power to its lowermost position in which it is shown in Figs. 35 and 39. The control mechanism 465 is provided with a rod 467 which extends through an apertured ear 468 on the table 464, this rod having a collar 469 adjustably secured thereon which is engaged by the ear 468 when the table 464 has been elevated a sufficient distance to complete a box binding operation, this engagement lifting the pedal 466 and reversing the power mechanism 465 to cause this to return the table 464 to its starting position.

The table 464 includes a base plate 475 on which are secured four longitudinal bars 476 joined by end bars 477 and 478. The bars 476 provide pivotal mountings for two parallel series of rollers 479 and form a central space 430 in which is mounted a box ejector 481 of the type shown in U. S. Letters Patent to Paxton, #2,121,820, this ejector operating automatically when the table 464 is lowered to eject a full multiple box 65 from this table onto a conveyor 482 provided to receive such boxes. (See Fig. 35.)

Mounted by bolts 484 on end bar 478 are stops 485, each of these stops being yieldably held against the bar 478 by a spring 486 on its bolt 484. (See Fig. 41.) Suspended from each stop 485 is a rod 487 which extends downwardly through a hole in a horizontal member 488 of the frame 410. The lower end of each rod 487 has a nut 489 and a spring 490, these springs engaging the member 488 as shown in Fig. 42 when the table 464 approaches its upper limits, thus drawing the stops 485 downwardy and causing the springs 486 to extend these stops beneath the boxes in the machine so that the stops will not interfere with the ejection of the boxes from the machine when the table is lowered.

Mounted in a similar manner by bolts 493 and springs 494 on the table end bar 477, are back stops 495 having fingers 496 extending downwardly therefrom. Journalled in suitable bearings on the table 464 is a small shaft 497, arms 498 of which are yieldably held up against the fingers 496 by a spring 499 connected to a catch 500 which is provided on an outer end of the shaft 497. When the table 464 is in its lower position as shown in Fig. 35, the catch 500 is disposed adjacent a collar 505 fixed on the vertical control rod 467 so that while any box is in the process of being delivered over one of the stops 495 onto the table 464, this stop is depressed, thus rotating the shaft 497 and bringing the catch 500 beneath the collar 505, this preventing the depression of the pedal 466 so that the table cannot be elevated until this box has passed entirely over its stop 495 and is thus in proper position to be operated upon. As one of the stops 495 is engaged by each of the matched boxes being fed onto the table 464, both of these boxes must be in place before both stops 495 will be free to rise.

Provided on the outer longitudinal bar 476 (Figs. 35, 36, 39 and 40) of the table 464 near the ends, are four uprights 506. At their upper ends, these uprights are connected by longitudinal bars 507 which are rigidly spaced by shafts 508 and by cross bars 510. The uprights 506 extend outwardly slightly at their lower ends from the side bars 476 before extending upwardly and in the angles thus formed are mounted right-angled guide shoes 511, the vertical flanges of which have openings 513. (See Fig. 35.) Fixed at their opposite ends in lower portions of the uprights 506 are shafts 514. Each of these shafts has a fixed arm 515. Swingable on the shafts 514 are heavy links 516, these links having bearings 517 at their upper ends in which is journalled a shaft 518, this shaft having an arm 519 which is the same length as the arm 515 and connected thereto by a link 520. Extending downwardly from the lower ends of the heavy links 516 are arms 521, these arms at opposite sides of the machine being connected by springs 522 which yieldably swing the links 516 to their outermost positions as shown in Fig. 39. Rotatable on shafts 518 are cam rollers 523. Fixed on the ends of these shafts are box pressing shoes 524.

Adjustably secured by bolts 525 to inner faces of the plates 415 and 416 are box compressing cams 526. Rotatable on shafts 508 are sleeves 527 and 528, these sleeves being positioned on these shafts by collars 529 and having arms 530 which are pivotally connected to and support a box separating guide 531. The sleeve 528 has an arm 532 extending upwardly therefrom for a purpose to be explained later.

Formed on the cross bars 510 (Figs. 41 and 42) are bearing blocks 540 which support clasp applicators 541, the construction of the latter being shown in Figs. 50, 51, and 52. Each of these applicators has a shaft 543 which extends through and journals in the bearings 540. Fixed on the shaft 543 is a hub sleeve 544 carrying frame arms 545 which are spaced by inner and outer spacers 546 and 547, the first of these spacers providing a pin 548, the purpose of which will be made clear hereinafter.

The arms 545 are provided with apertures 549, in which sleeves 550 are slidably disposed, these sleeves being mounted on bolts 551 which press these sleeves inwardly against blocks 555 and 556 of a punch holder 557 so as to assemble and shiftably support this punch holder. Supported on two studs 560 on outer faces of the arms 545 are leaf springs 561 which bear against opposite ends of the bolts 551 and thus tend to yieldably centralize the punch holder 557 on the frame of the clasp applicator 541.

Each of the applicators 541 is adapted for receiving and yieldably retaining a clasp 562 (see Fig. 53) which is of the type disclosed in the copending application of W. H. Paxton, deceased, Geraldine Paxton and H. S. Nicks, executors, Serial No. 332,321, filed April 29, 1940, and entitled "Package clasp." This clasp is formed of sheet metal and has a central web 563 from the lower edge of which teeth 564 are formed which project alternately in opposite directions from the plane of said web. Formed from the upper edge of the web 563 is a central wing 565 which is inclined at an oblique angle away from the web 563, and a series of smaller wings 566 and 567 which are alternately inclined in a similar manner in opposite directions from the web at each end of the wing 565. Each of the wings 565, 566 and 567 has teeth 568 bent downwardly along its outer edge.

Openings 570 and 571 are provided in the central face of the block 555 for receiving wings 565 and 566 when a clasp 562 is inserted in one of the applicators 541 as shown in Fig. 52 preparatory to operation of the binder 64. Likewise, openings 572 are provided in the inner face of the block 556 for reception of the wings 567 of the clasp 562. Mounted in the block 555 adjacent the endmost opening 571 is a spring pressed clasp supporting latch 573 having an oblique cam face 574 for engagement by one of the wings 566 and a notch 575 for receiving said wing after the latter has been inserted past the face 574. The latch 573 also has an upper oblique cam face 576, the purpose of which will be made clear hereinafter. An identical spring clasp latch 580 is mounted in the block 556 in the opposite end of the punch holder 557 so as to extend into an endmost one of the openings 572. (See Figs. 50 and 51.)

Mounted in the endmost openings 571 and 572 adjacent the latches 573 are wing punches 581, these being hollowed out internally to receive springs 582 and having slots 583 through which pins 584 extend, said pins limiting the upward movement of the punches 581 and the springs 582 yieldably holding these punches in their extreme upwardmost position against the pins 584. Each of the punches 581 has a cam face 585 which meets and bears against the cam face 576 of the adjacent one of the latches 573 and 580 between operations of the binder 64. These cam faces are such that when sufficient pressure is placed on the punches 581 to force these further into the openings 571 and 572 which they occupy, the latches 573 and 580 are cammed out of the openings 571 and 572 into which they extend.

The other openings 570, 571, and 572 are provided with punches 586 and 587 which are yieldably held in upward position in their respective openings in the same manner as the punches 581, all of the punches being of a size to slidably fit their respective openings, the punch 586 being necessarily larger than the others as shown in Fig. 51. Each of the punches 581, 586, and 587 is provided with a semi-cylindrical boss 588 which bosses extend above the upper surface of the punch holder 557.

The shaft 543 of one of the applicators 541 is provided with a bifurcated arm 589 (see Figs. 35, 36 and 40) in which is pivotally mounted a slide block 590. Pivoted to the arm 532 is a rod 591 which slides freely through the block 590 and has a nut 592 on its end.

Extending inwardly from each of the plates 420 are brackets 593 (Figs. 41, 42 and 49) which rigidly support a horizontal shaft 594 carrying a driver actuating roller 595. Rotatable on an extending end of the shaft 594 is a hook arm 596, there being a coil spring 597 on the shaft 594, opposite ends of which engage with the arm 596 and with a collar 598 fixed on this shaft so as to continually urge this arm toward the position in which it engages a pin 599 provided on one of the brackets 593. (See Fig. 49.) The hook arm 596 has a recess 600 which normally receives the pin 548 of the adjacent clasp applicator 541 so as to retain this applicator in horizontal position as shown in Figs. 35 and 43 during intervals between binding operations by the binder 64.

Operation

The binder 64 is attended by an operator who controls the machine through the pedals 460 and 466. Before starting the binding operation, the operator takes two clasps 562 from the boxes (not shown) which are supported in the receptacles 422, and places one of these clasps in each of the clasp applicators 541. He does this by slipping the wings of this clasp up into the openings 570, 571, and 572, causing the wing 566 adjacent the catch 573 and the wing 567 adjacent the catch 580 to press these catches back until these wings snap into the recesses 575.

Having thus supplied the machine with clasps, the operator depresses the stop rollers 452 by putting his foot on the pedal 460, thus allowing the foremost pair of boxes on the accumulator 425 to be fed by the rollers 441 rotating beneath this box onto the wheels 430 and by these wheels onto the rollers 479 of the table 464. These boxes are shown in position on the table as at the commencing of a binding operation in Figs. 39 and 41. In the latter view, it is seen that each of these boxes 66 has entered the binder 64 with such speed that when it engages its stop 485 the latter is shifted to collapse its spring 486 and thus permit the stop 495 on this side of the binder to rise to its upward position as shown in Fig. 41 and yieldably engage the rear of the box when the recoil of the spring 486 shifts the box backward. Each of the boxes 66 thus fed into the binder is now yieldably held in a fore-and-aft direction by the stops 485 and 495.

The operator now depresses the pedal 466 which sets in motion the elevating mechanism 465, this lifting the table 464 from the position in which it is shown in Figs. 39 and 41 to the position in which it is shown in Figs. 40 and 42. During the first part of this upward travel of the table 474, the hook arms 596 are swung 90 degrees from the position in which one of these is shown in Fig. 43 to that shown in Fig. 44, this swinging the applicators 541 inwardly and inserting the central webs 563 of the clasps 562 in the space between the boxes 66. This movement also swings the arm 589 through an angle of 90 degrees which, acting through the link 591 and arm 532, swings the box separating guide upwardly and out from between the boxes as shown in Fig. 42. This action is completed shortly after the start upward of the elevator 464, and just as the rollers 523 are engaging the inclined faces of the cams 526, whereby the box press shoes 524 are started inwardly. As the rollers 523 ride from the inclined faces of the cams 526 onto their vertical faces, the inward movement of the shoes 524 is completed with the result that the bottoms of the boxes 66 are pressed together impaling these on the teeth 564 of the clasps 562. This action is completed as shown in Fig. 47 before the table 464 is risen sufficiently for the rollers 595 to be brought into contact with the semi-cylindrical bosses 588 of the punches 581, 586, and 587.

As the table 464 continues upwardly with the clasp applicators 541 positioned as shown in Fig. 44, the rollers 595 ride over the semi-cylindrical bosses 588 of the various clasp wing punches in the applicators so as to force these punches inwardly against the respective wings of the clasps, causing the teeth on the ends of these wings to be pressed into the ends of the boxes 66 at the time the latter are pressed close together with the bottoms of the boxes impaled on the teeth 564. As the rollers 595 push each of the punches 581 inwardly, the latches 580 and 573 in their respective turns are cammed out of engagement with the clasp 562 so that these drivers are free, then, to drive into the boxes 66 the endmost wings 566 and 567 formerly held by these latches in the openings adjacent thereto.

When the table 464 rises to the point where the binding operation just described is completed, the ear 468 engages the collar 469 on the rod 467, thus lifting the pedal 466 and initiating the reversing of the mechanism 465 to withdraw the table 464 downwardly under power until it reaches its normal lower position as shown in Figs. 35, 39, and 41. While the binder table is thus being lowered, the multiple box 65 produced by binding together the two half boxes 66 in the binder 64 is rapidly ejected from the binder by the ejector 481 in the manner described in the aforesaid patent which discloses said ejector.

As the multiple box 65 leaves the binder 64, the table 464 has approached its downwardmost position to the point where the pins 548 enter the recesses 600 in the hook arms 596 as indicated in Fig. 44, so that the final downward movement of the table 464 swings these hook arms downwardly through angles of 90 degrees and swings the clasp applicators 541 upwardly into horizontal positions as shown in Fig. 43. This frees the box 65 for ejection from the binder and causes the rod 591 to slide in the block 590 allowing the box separating guide 531 to rest on the box 65 while the latter is leaving the machine, after which guide 531 swings back to its lower position by gravity. (See Figs. 31, 35, and 41.)

From the foregoing description of the structure and operation of the apparatus 60 of the invention, it is seen that this invention provides means for rapidly lidding, matching, and then binding together the half boxes 66 to produce multiple boxes 65, each of which multiple boxes contains only a single size of fruit. This invention is thus suitable for use in fresh fruit packing houses where the packing of half boxes is done under such conditions as to render it impractical to segregate and match the half boxes prior to their delivery to the lidder. An important advantage of the invention is that it is not only thus adaptable for use in connection with the generally prevailing practices of packing fresh fruits, but that the complex functions performed by the invention are accomplished without requiring more than one operator in addition to the lidder operator ordinarily required in packing fresh fruits.

While only a single embodiment of the apparatus of the invention has been illustrated and described herein, it is to be understood that various modifications might be made in this without departing from the spirit of the invention or the scope of the appended claims.

We claim:

1. In combination: a conveyor; matching means for removing boxes from said conveyor and placing the same in reserve and then subsequently returning said boxes to said conveyor; means for indicating the classification of a box (X) fed to said matching means; and means responsive to said indicating means to cause said box matching means to remove the box (X) from said conveyor if there is no matching box (Y) held in reserve by said matching means, and in the event there is such a matching box in reserve, causing said box matching means to return said matching box (Y) to said conveyor and leave said box (X) on said conveyor to be discharged with said matching box (Y) from said box matching means by said conveyor.

2. In a box matcher, the combination of: a conveyor for delivering boxes to and discharging said boxes from said matcher; box matching means for receiving a box from said conveyor and transferring said box therefrom to produce a reserve of matching boxes and returning one of said matching boxes to said conveyor when one of said matching boxes corresponds to an additional box delivered to said box matcher on said conveyor; and means for causing a relative vertical movement between said matching means and said conveyor to facilitate the removal of a box from or the return of a box to said conveyor by said matching means.

3. In combination: a box conveyor for receiving and discharging boxes; rotary magazine means for receiving boxes from said conveyor and rotatable to remove said boxes from over said conveyor, said magazine means being also adapted to return to said conveyor the boxes thus removed; and means for controlling said rotary means to remove boxes from over said conveyor when not needed and to return said boxes to said conveyor when needed.

4. In combination: rotary box magazine means adapted to receive and store up boxes and then offer a selected one of said boxes for discharge therefrom; means for delivering boxes to and receiving said boxes from said magazine means; and control means causing said rotary magazine means to store up said boxes except when a box already in storage matches a box being fed to said magazine means, said control means causing said magazine means to offer for discharge said matching box and causing said box delivering and receiving means to receive said matching box from said magazine means and position the same in predetermined relation with the aforesaid box being fed to said magazine means.

5. In combination: rotary magazine means; means for feeding boxes into and through said magazine means; and means to control said magazine means to cause the same to remove an unmatched box from said feed means and place said box in storage in said magazine means, or to return a matching box from storage in said magazine means to said feed means for subsequent discharge from said magazine means with a box carried by said feed means and matched by said matching box.

6. In combination: magazine means; means for feeding boxes into and from said magazine means; and means to control said magazine means to cause the same to operate selectively to remove an unmatched box from said feed means and place said box in storage in said magazine means, or to return a matching box from storage in said magazine means to said feed means for discharge on said feed means with a box matched respectively thereby.

7. In combination: a series of magazine means placed in tandem; means for feeding boxes into and through said tandem magazine means; means for selectively operating said magazine means to cause boxes traveling through said magazine means to be intercepted and removed from said feed means and placed in storage in one of said magazine means; and means for selectively causing one or the other of said magazine means to return a box previously stored therein as aforesaid to said feed means for discharge of said box from said magazine means.

8. In combination: a plurality of rotary box magazines placed in tandem; a conveyor extending through said magazines; means for causing relative vertical movement between said conveyor and said magazine to cause a box on said conveyor to be delivered to one or the other of said magazine means, or to be delivered from said magazine means to said conveyor; and means for rotating one or the other of said magazine means to receive a box just delivered thereto and to shift said box away from over said conveyor or to bring a box previously thus removed from over said conveyor back into position for delivery onto said conveyor.

9. In combination: a plurality of rotary box magazines; a conveyor extending through said magazines; means for indicating the classification of a box delivered to said conveyor; stop means automatically controlled by said indicating means for stopping said box within one or the other of said magazine means; and means for causing said box to be transferred to the magazine means in which it is thus stopped and placed in storage to be subsequently returned to said conveyor.

10. In combination: a plurality of magazines; a conveyor extending through said magazines; means for indicating the classification of a box being delivered onto said conveyor; stop means responsive to said indicating means for stopping said box on said conveyor opposite one or the other of said magazines; means causing said box to be removed from said conveyor by the magazine opposite which said box stopped, each of said magazines having a passage space; and means responsive to said indicating means for causing the balance of said magazines other than the one designated as aforesaid for receiving said box, to be positioned with the passage spaces aforesaid of said balance of said magazines disposed opposite said conveyor.

11. In combination: a rotary magazine; means providing circumferentially spaced chambers for boxes on said magazine; means for feeding a box into said magazine into one of said chambers; means for rotating said magazine to present a selected one of said chambers for receiving said box; and means operative for yieldably retaining boxes in said chambers when the latter are positioned otherwise than for receiving a box as aforesaid and leaving each of said chambers free when positioned as aforesaid to receive a box or to have a box removed therefrom.

12. In combination: a rotary magazine; means providing circumferentially spaced chambers for boxes on said magazine; means for feeding a box into said magazine into one of said chambers; means for rotating said magazine to present a selected one of said chambers for receiving said box; an endless chain adapted to extend through each of said chambers when the latter is not in box receiving position; and means for guiding said chain so that the latter is substantially withdrawn from each of said chambers when the latter is positioned as aforesaid for receiving a box so as not to hinder the delivery of a box to or the discharge of a box from said chamber when so positioned, said means also placing a yieldable tension on said chain to cause the latter to retain snugly in each of the chambers not in a box receiving position any box which may have been delivered to said chamber.

13. In combination: a conveyor for carrying boxes in tandem relation; means for diverting boxes from said tandem relation to side-by-side relation and stopping said boxes in said side-by-side relation; and means responsive to the delivery of said boxes into said side-by-side relation to rotate said boxes into bottom-to-bottom relation, said means for stopping said boxes in side-by-side relation being rendered inoperative by said means for rotating said boxes so as to permit the discharge of said boxes following their rotation into bottom-to-bottom relation.

14. In combination: a tandem conveyor for conveying boxes in tandem fashion and resting on their bottoms; a dual conveyor for conveying boxes side-by-side; means for diverting boxes from said tandem conveyor into side-by-side relation on said dual conveyor; and means for engaging said boxes on said dual conveyor, rotating said boxes into bottom-to-bottom relation, and causing said boxes to be discharged from said dual conveyor.

15. In combination: a conveyor for conveying boxes in tandem fashion resting on their bottoms; a first dual conveyor for conveying boxes side-by-side on their bottoms; a second dual conveyor carrying said boxes bottom-to-bottom; means for diverting said boxes from said tandem conveyor into side-by-side relation on said first dual conveyor; and means for repositioning said last mentioned boxes in bottom-to-bottom relation whereby said boxes are adapted to be delivered from said first dual conveyor to said second dual conveyor.

16. In combination: means for receiving two boxes and halting said boxes in side-by-side relation; and means responsive jointly to the delivery of both of said boxes to said position to rotate said boxes into bottom-to-bottom relation.

17. In combination: a first dual conveyor adapted to receive a pair of boxes in side-by-side relation on their bottoms; a second dual conveyor adapted to convey boxes delivered thereto from said first dual conveyor in bottom-to-bottom relation; means for stopping boxes in said side-by-side relation on said first conveyor; and means for rotating a pair of boxes, when so stopped, into bottom-to-bottom relation and returning said boxes onto said first dual conveyor, said boxes when so returned being out of alignment with said stop means and free to be discharged by said first conveyor onto said second conveyor.

18. In combination: magazine means; means for delivering mixed boxes of a plurality of different classes to said magazine means; box classification means for controlling said delivery to selectively deliver boxes of a particular class to a particular portion of said magazine and to deliver those not of said class elsewhere in said magazine; and means responsive to said classification means and causing discharge of a box of a given class from said magazine means when another box of the same class is presented to and classified by said classification means.

19. In combination: magazine means; means for delivering mixed boxes of a plurality of different classes to said magazine means; box classification means for controlling said delivery to selectively deliver boxes of a particular class to a particular portion of said magazine and to deliver those not of said class elsewhere in said magazine; means responsive to said classification means and causing discharge of a box of a given class from said magazine means when another box of the same class is presented to and classified by said classification means, said delivery means and discharge means embodying a conveyer means which brings together said box of a given class and said box of the same class upon the discharge of said box of a given class from said magazine means.

GERALD C. PAXTON.
GLENN E. STILWELL.